(12) United States Patent
Kishiyama et al.

(10) Patent No.: US 10,187,830 B2
(45) Date of Patent: Jan. 22, 2019

(54) USER APPARATUS, BASE STATION, AND COMMUNICATION METHOD

(71) Applicant: NTT DOCOMO, INC., Tokyo (JP)

(72) Inventors: Yoshihisa Kishiyama, Tokyo (JP); Yuichi Kakishima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/114,216

(22) PCT Filed: Jan. 26, 2015

(86) PCT No.: PCT/JP2015/052052
§ 371 (c)(1),
(2) Date: Jul. 26, 2016

(87) PCT Pub. No.: WO2015/115376
PCT Pub. Date: Aug. 6, 2015

(65) Prior Publication Data
US 2016/0345216 A1 Nov. 24, 2016

(30) Foreign Application Priority Data

Jan. 31, 2014 (JP) .................................. 2014-018044
Apr. 30, 2014 (JP) .................................. 2014-094156

(51) Int. Cl.
*H04W 4/00* (2018.01)
*H04W 36/00* (2009.01)
(Continued)

(52) U.S. Cl.
CPC ......... *H04W 36/0083* (2013.01); *H04L 5/005* (2013.01); *H04W 36/30* (2013.01);
(Continued)

(58) Field of Classification Search
CPC . H04W 36/0083; H04W 36/30; H04W 36/32; H04W 48/12; H04W 72/0413
(Continued)

(56) References Cited

U.S. PATENT DOCUMENTS

2014/0177601 A1* 6/2014 Nishio .................. H04W 24/10
370/332
2016/0073393 A1* 3/2016 Kim .................... H04W 72/046
455/509

FOREIGN PATENT DOCUMENTS

JP 2009-545226 A 12/2009
JP 2013219507 A 10/2013
(Continued)

OTHER PUBLICATIONS

International Search Report issued in corresponding application No. PCT/JP2015/052052 dated Apr. 14, 2015 (2 pages).
(Continued)

*Primary Examiner* — Sai Ming Chan
(74) *Attorney, Agent, or Firm* — Osha Liang LLP

(57) ABSTRACT

A user apparatus configured to communicate with a base station in a radio communication system including a base station and the user apparatus, including: first reference signal reception means configured to measure a received power of first reference signals, transmitted from the base station, that are associated with a plurality of different identifiers, and to select a specific first reference signal; report means configured to report an identifier and a received power of the first reference signal selected by the first reference signal reception means to the base station or a macro cell base station; second reference signal reception means configured to receive a plurality of second reference signals transmitted from the base station; and measurement means configured to measure a reception quality of the second reference signals received by the second reference signal reception means, and to transmit feedback information based on the reception quality to the base station.

11 Claims, 30 Drawing Sheets

(51) Int. Cl.
  *H04W 48/12* (2009.01)
  *H04L 5/00* (2006.01)
  *H04W 36/30* (2009.01)
  *H04W 36/32* (2009.01)
  *H04W 72/04* (2009.01)
  *H04B 7/06* (2006.01)

(52) U.S. Cl.
  CPC ........... *H04W 36/32* (2013.01); *H04W 48/12* (2013.01); *H04W 72/0413* (2013.01); *H04B 7/0617* (2013.01)

(58) Field of Classification Search
  USPC ......................................................... 370/331
  See application file for complete search history.

(56) References Cited

FOREIGN PATENT DOCUMENTS

| | | |
|---|---|---|
| JP | 2014-527370 A | 10/2014 |
| WO | 2013/005105 A3 | 1/2013 |
| WO | 2013032188 A2 | 3/2013 |

OTHER PUBLICATIONS

Written Opinion of the International Searching Authority issued in corresponding application No. PCT/JP2015/052052 dated Apr. 14, 2015 (5 pages).
Partial Supplementary European Search Report issued in the counterpart European Patent Application No. 15743011.7, dated Dec. 8, 2016 (7 pages).
Extended European Search Report issued in corresponding European Application No. 15743011.7, dated Apr. 12, 2017 (17 pages).
Alcatel-Lucent, Alcatel-Lucent Shanghai Bell; "Reduced CRS design on NCT"; 3GPP TSG RAN WG1 Meeting #74, R1-132955; Barcelona, Spain; Aug. 19-23, 2013 (3 pages).
Motorola Mobility; "Small cell discovery"; 3GPP TSG RAN WG1 #72bis, R1-131519; Chicago, USA; Apr. 15-19, 2013 (2 pages).
Office Action issued in corresponding Japanese Application No. 2014-094156, dated Aug. 7, 2018 (7 pages).
Office Action issued in corresponding Japanese Patent Application No. 2014-094156, dated Mar. 20, 2018 (7 pages).

* cited by examiner

FIG.26
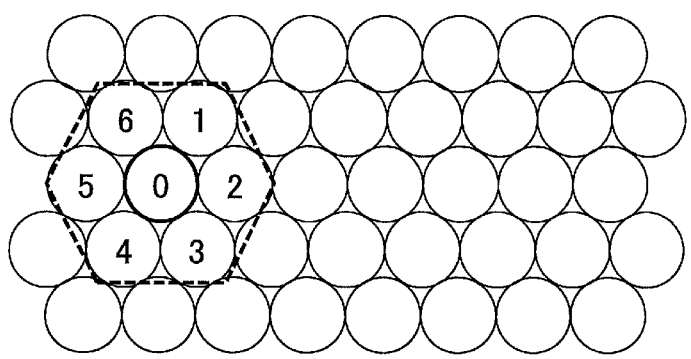
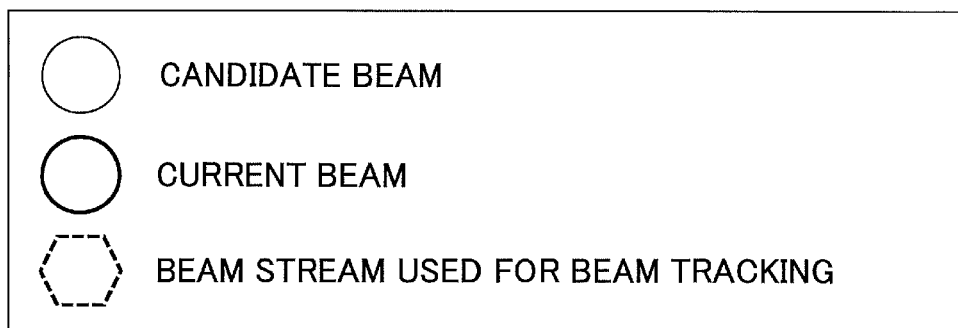

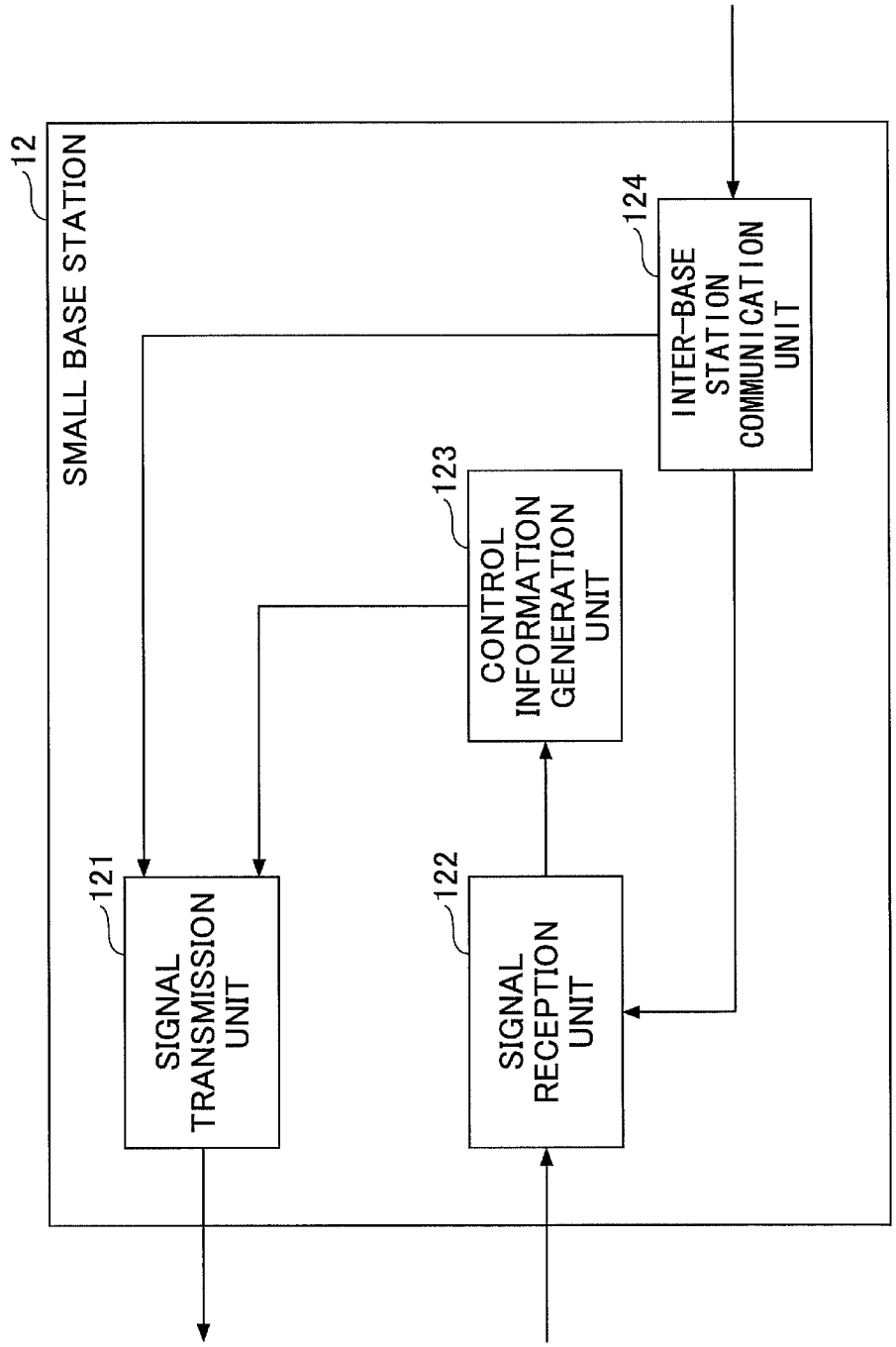

USER APPARATUS, BASE STATION, AND COMMUNICATION METHOD

TECHNICAL FIELD

The present invention relates to a base station and a user apparatus in a radio communication system.

BACKGROUND ART

In LTE/LTE-Advanced, MIMO techniques are adopted for enhancing system capacity, cell-edge user throughput and the like. Also, a heterogeneous network technique is adopted for realizing high quality communication by reducing inter-cell interference while different types of base stations (macro cell, small cell and the like) coexist.

Especially, in a small cell of the heterogeneous network, it is assumed to use a high frequency band. Here, since propagation loss increases in the high frequency band, in order to compensate it, it is considered to apply massive MIMO that performs narrow beamforming in which the beam width is narrow.

The massive MIMO is a large-scale MIMO having many antennas (example: 100 elements) in the base station side, by which inter-user interference can be made small since the strength of the electric field can be concentrated on a small area.

RELATED ART DOCUMENT

Patent Document

[PATENT DOCUMENT 1] JP2013-219507

SUMMARY OF THE INVENTION

Problem to be Solved by the Invention

FIG. 1 is a diagram showing an example of a communication environment in which there are many small cells to which the massive MIMO is applied. As shown in FIG. 1, many beams are transmitted from a base station of each small cell. In a case where a user apparatus (UE) performs communication while moving in such an environment, it is necessary that the user apparatus selects a specific beam which is suitable for the current position and sequentially switches the beams according to the move.

For realizing the operation, it can be considered that the user apparatus monitors reference signals of every beam that becomes a candidate. However, assuming that the number of beams per 1 small cell is 100, and that there is a possibility that the UE resides in any of 100 small cells, the user apparatus UE needs to monitor 100×100=10000 beams. There is a problem in that such an operation increases overhead of reference signals and an information amount of feedback, and increases complexity of processing in the user apparatus.

The present invention is contrived in view of the above-mentioned points, and an object of the present invention is to provide a technique, in a radio communication system including a base station that performs beamforming and a user apparatus, to enable the user apparatus to efficiently select a specific beam for use in communication from among a plurality of beams that are formed by the base station.

Means for Solving the Problem

According to an embodiment of the present invention, there is provided a user apparatus configured to communicate with a base station in a radio communication system including a base station and the user apparatus, including:

first reference signal reception means configured to measure a received power of first reference signals, transmitted from the base station, that are associated with a plurality of different identifiers, and to select a specific first reference signal;

report means configured to report an identifier and a received power of the first reference signal selected by the first reference signal reception means to the base station or a macro cell base station;

second reference signal reception means configured to receive a plurality of second reference signals transmitted from the base station; and measurement means configured to measure a reception quality of the second reference signals received by the second reference signal reception means, and to transmit feedback information based on the reception quality to the base station.

According an embodiment of the present invention, there is provided a base station configured to communicate with a user apparatus in a radio communication system including the base station and the user apparatus, including:

first reference signal transmission means configured to transmit first reference signals associated with a plurality of different identifiers;

second reference signal transmission means configured to transmit a plurality of second reference signals at a timing different from a timing when transmitting the first reference signals; and information reception means configured to receive feedback information based on a reception quality of the second reference signals measured in the user apparatus, wherein the first reference signal transmission means transmits the first reference signals mapped only to a part of a frequency area, and wherein the second reference signal transmission means transmits the second reference signals mapped to a frequency area wider than the frequency area to which the first reference signals are mapped.

According an embodiment of the present invention, there is provided a communications method executed by a user apparatus configured to communicate with a base station in a radio communication system including a base station and the user apparatus, including:

a first reference signal reception step of measuring a received power of first reference signals, transmitted from the base station, that are associated with a plurality of different identifiers, and selecting a specific first reference signal;

a report step of reporting an identifier and a received power of the first reference signal selected by the first reference signal reception step to the base station or a macro cell base station;

a second reference signal reception step of receiving a plurality of second reference signals transmitted from the base station; and a measurement step of measuring a reception quality of the second reference signals received by the second reference signal reception step, and to transmit feedback information based on the reception quality to the base station.

According an embodiment of the present invention, there is provided a communication method executed by a base station configured to communicate with a user apparatus in a radio communication system including the base station and the user apparatus, including:

a first reference signal transmission step of transmitting first reference signals associated with a plurality of different identifiers;

a second reference signal transmission step of transmitting a plurality of second reference signals at a timing different from a timing when transmitting the first reference signals; and an information reception step of receiving feedback information based on a reception quality of the second reference signals measured in the user apparatus, wherein the first reference signal transmission step includes transmitting the first reference signals mapped only to a part of a frequency area, and wherein the second reference signal transmission step includes transmitting the second reference signals mapped to a frequency area wider than the frequency area to which the first reference signals are mapped.

Effect of the Present Invention

According to an embodiment of the present invention, there is provided a technique, in a radio communication system including a base station that performs beamforming and a user apparatus, to enable the user apparatus to efficiently select a specific beam for use in communication from among a plurality of beams that are formed by the base station.

BRIEF DESCRIPTION OF THE DRAWINGS

FIG. 26 is a diagram for explaining beam tracking;

FIG. 31 is a functional block diagram of a small base station 12.

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below. For example, although it is assumed that a radio communication system of the present embodiment is a system of a scheme complying with LTE, the present invention is not limited to LTE, and can be applied to other schemes. In the specification and the claims, the term "LTE" is used as a wide meaning including not only a communication scheme corresponding to 3GPP release 8 or 9, but also a communication scheme corresponding to 3GPP release 10, 11, 12 or later release.

Also, in the present embodiment, basically, although a configuration of reference signals of 3 layers is described as an example, the number of layers is not limited to this. The number of layers may be 2, or may equal to or greater than 4

(System Whole Configuration, Operation Outline)

Figure 1:
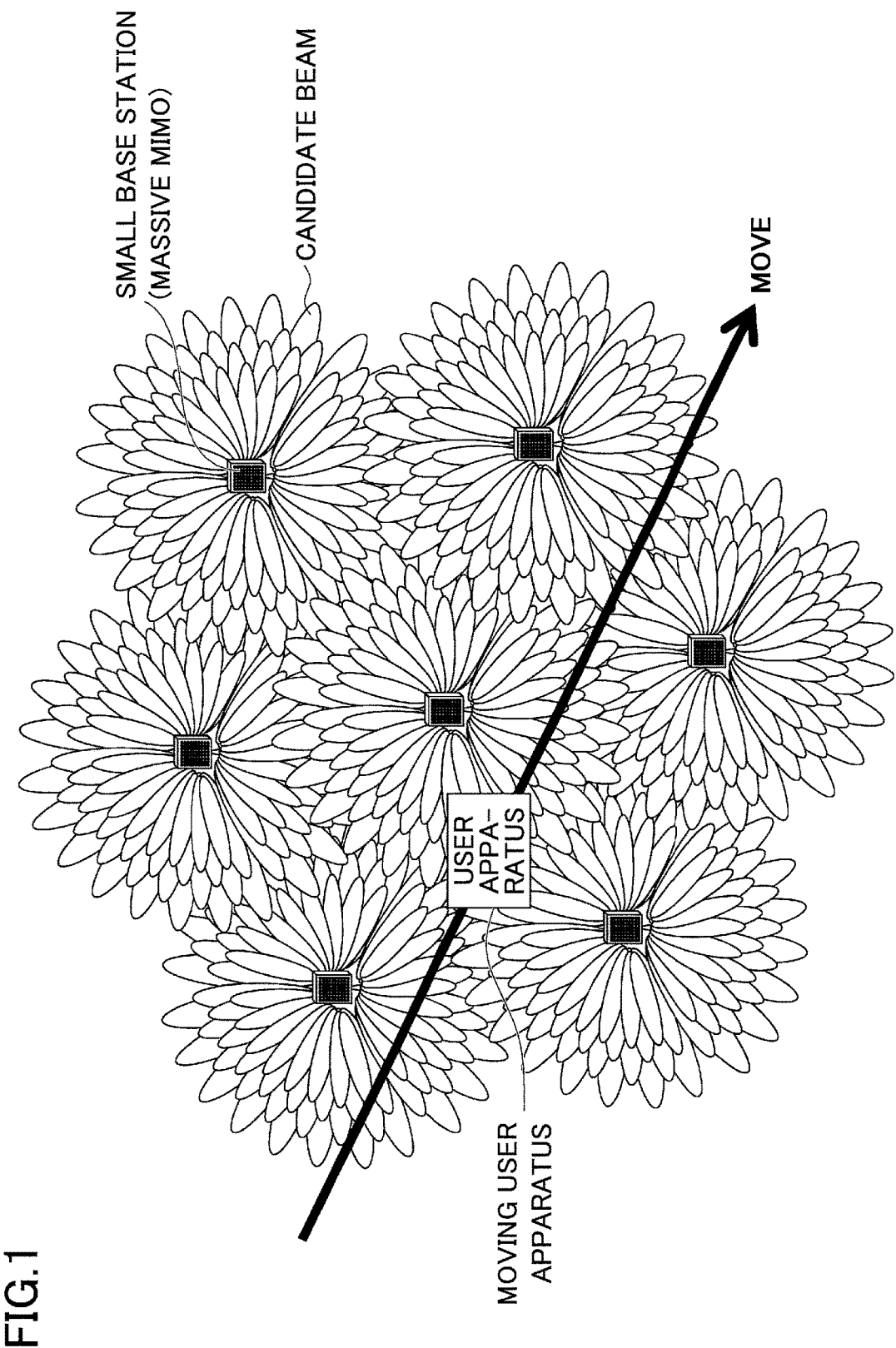
FIG. 1 is a diagram showing an example of a communication environment in which a plurality of small cells that perform massive MIMO transmission exist.
Figure 2:
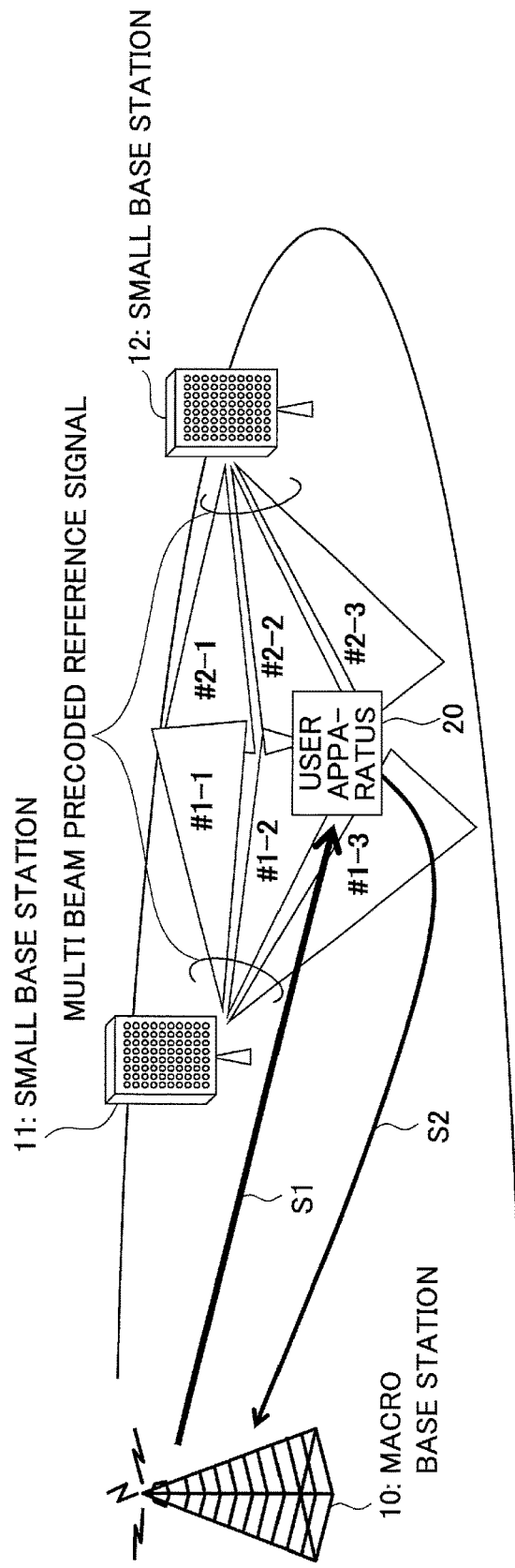
FIG. 2 is a whole block diagram of a radio communication system in an embodiment of the present invention.

FIG. 2 shows a whole block diagram of a radio communication system in an embodiment of the present invention. The radio communication system of the present embodiment includes a macro base station 10 that forms a macro cell, and small base stations 11, 12 provided in a coverage area of the macro cell. Also, FIG. 2 shows a user apparatus 20 that communicate with the macro base station 10, small base stations 11, 12 and the like.

The radio communication system is configured such that a macro coverage is ensured by the macro base station 10 using a low frequency band, and traffic of small areas (example: hot spots) are absorbed by the small base stations 11, 12 using a high frequency band. However, such frequency assignment is merely an example, and the assignment is not limited to this.

The small base station 11, 12 of the present embodiment is provided with a function of massive MIMO so as to be able to form various beams from a wide beam to a narrow beam. FIG. 2 also shows operation outline of the radio communication system. In the present embodiment, as shown in FIG. 2, a plurality of precoded reference signals (each being referred to as discovery signal) are transmitted from each small base station, wherein each precoded reference signal is transmitted by a beam. By the way, "reference signal is precoded" means that, in an example of transmission, a transmission signal is multiplied by a weight for each antenna port such that the reference signal is transmitted by a beam of a width. For example, in the example shown in FIG. 2, a discovery signal is transmitted from the small base station 12 in each of a beam 2-1, a beam 2-2 and a beam 2-3.

The user apparatus 20 receives a macro-assisted information from the macro base station 10 in an coverage area of a macro cell (step 1), and monitors a plurality of discovery signals (discovery signals transmitted by each beam) transmitted from the small base stations 11, 12 using the macro-assisted information so as to receive (detect) a specific discovery signal. The user apparatus 20 measures reception quality (received power and the like) base on the received discovery signal to transmit a measurement report to the macro base station 10 (step 2). Then, the macro base station 10 determines a beam by which the user apparatus 20 received the signal with the best quality (example: the received power is the highest) based on the measurement report, and transmits, to the user apparatus 20, control information related to the beam (example: identification information of a discovery signal corresponding to the beam, information of a measurement reference signal corresponding to the discovery signal, and the like). According to the control information, the user apparatus 20 receives a reference signal (to be referred to as measurement reference signal), on the determined beam, that is transmitted by a corresponding small base station with a further narrower beam. Through these operations, the user apparatus 20 is assigned a radio resource for receiving a data signal (PDSCH and the like) transmitted by a narrow beam so as to be able to receive a data signal. The operation of the radio communication is described later in more detail.

(Hierarchical Structure of Reference Signal)

Figure 3:
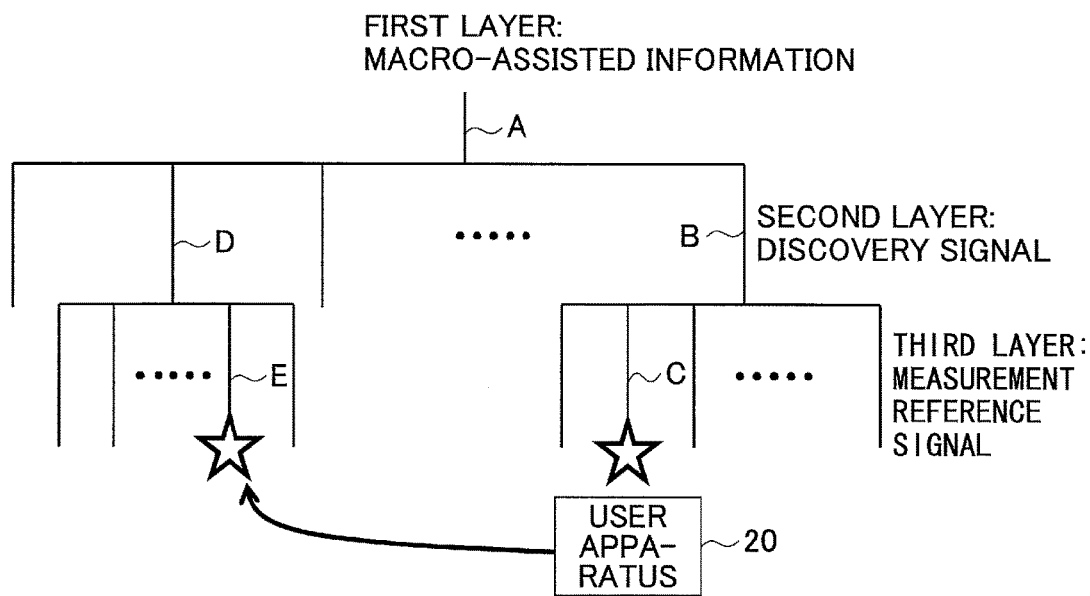
FIG. 3 is a diagram showing a hierarchical structure of reference signals used in a radio communication system in the present embodiment.

The reference signal that is used in the radio communication system in the present embodiment is described with reference to FIG. 3. As shown in FIG. 3, the reference signal of the present embodiment has a hierarchical structure, so that the user apparatus 20 refers to reference signals from an upper layer reference signal to a lower layer reference signal sequentially so as to be able to detect an optimum beam in a plurality of beams transmitted from small base stations and to receive a desired data signal by the beam. By adopting such a hierarchical structure, candidates of beams can be narrowed efficiently, so that it is possible to perform detection and switching of an optimum beam quickly without searching reference signals of an enormous number of beams.

More particularly, in the example shown in FIG. 3, there is macro-assisted information as a first layer. As described before, the macro-assisted information is transmitted to the user apparatus 20 in the macro coverage from the macro base station 10, so that the user apparatus 20 performs reception of a discovery signal using the macro-assisted information.

The macro-assisted information includes, for example, information of a radio resource by which the discovery signal is transmitted (timing, frequency and the like), sequence information of the discovery signal, and the like. Although the channel for transmitting the macro-assisted information by the macro base station 10 is not limited to a specific type of channel, the macro-assisted information is transmitted, for example, by using a control channel, a broadcast channel or a data channel defined in LTE.

Although there are a plurality of macro base stations in the radio communication system, the user apparatus 20 can ascertain information of discovery signals, that may be received in the macro cell where the user apparatus 20 resides, that should be searched by referring to the macro-assisted information. That is, by the macro-assisted information, the user apparatus 20 can specify the branch of "A" shown in FIG. 3.

Since the macro-assisted information is a signal which is referred (which becomes a reference) to by the user apparatus 20, it can be called a reference signal.

As a second layer, there is a discovery signal. The discovery signal is precoded, and is a signal that is transmitted from the small base station 11, 12 by using a beam wider than that of a transmission beam of an after-mentioned measurement reference signal. A plurality of discovery signals are transmitted from each small base station by beams different from each other, so that the user apparatus 20 monitors each discovery signal based on the macro-assisted information, and receives (detects) the discovery signal so as to perform measurement of reception quality (received power and the like). By the way, in the present embodiment, unless otherwise specified, the term of "reception quality" is used as having wide meaning including received power. Based on the reception quality of each discovery signal, a discovery signal of a beam suitable for the user apparatus 20 is specified, so that a measurement reference signal that the user apparatus 20 should receive is determined. Information (sequence and the like) included in the discovery signal is associated with a beam. The information may be referred to as "identifier". That is, the user apparatus measures reception qualities (received powers and the like) of discovery signals, associated with a plurality of different identifiers, transmitted from the base station, to select a specific discovery signal. The determination method is described later. In the example of FIG. 3, for example, a branch of "B" is selected in the second layer, and a plurality of measurement reference signals under the branch "B" are specified as measurement reference signals that the user apparatus 20 should receive.

As to the discovery signal, since it is a signal referred to by the user apparatus 20, it can be called "reference signal". Also, in the present embodiment, the discovery signal is used also for the user apparatus 20 to establish synchronization with the small base station 11, 12. Thus, the discover signal may be also called "synchronization signal". An example is described later in which PSS (Primary Synchronization signal)/SSS (Secondary Synchronization signal) which is a synchronization signal is used as a discovery signal.

As a third layer, there is a measurement reference signal. The measurement reference signal is a signal transmitted from the small base station by a beam of a narrower width than (it may be the same width as) that of a beam for transmitting a discovery signal specified in the second layer. The small base station transmits the measurement reference signal for each beam. The user apparatus 20 receives each measurement reference signal, and measures a reception quality (received power and the like) to perform operation for returning feedback information (example: identification of a measurement reference signal of the highest received power) to the small base station. The small base station that receives the feedback information performs link adaptation, rank adaptation, scheduling and the like for downlink data signal based on the feedback information.

In the example shown in FIG. 3, for example, as a result that the user apparatus 20 performs measurement of reception quality of a measurement reference signal, a beam corresponding to a measurement reference signal of the branch shown as "c" is selected as a beam for data communication, so that the user apparatus 20 receives a data signal transmitted from the small base station by the beam.

A plurality of beams may be selected finally. In the example of FIG. 3, a beam of the branch C and a beam of a branch E are selected. By using a plurality of beams by the user apparatus 20, for example, it can be realized to improve throughput by cooperative transmission and to perform load balancing and the like using a plurality of small base stations.

In the following, the discovery signal and the measurement reference signal are described in more detail.

(Details of Discovery Signal and Measurement Reference Signal)

Figure 4:
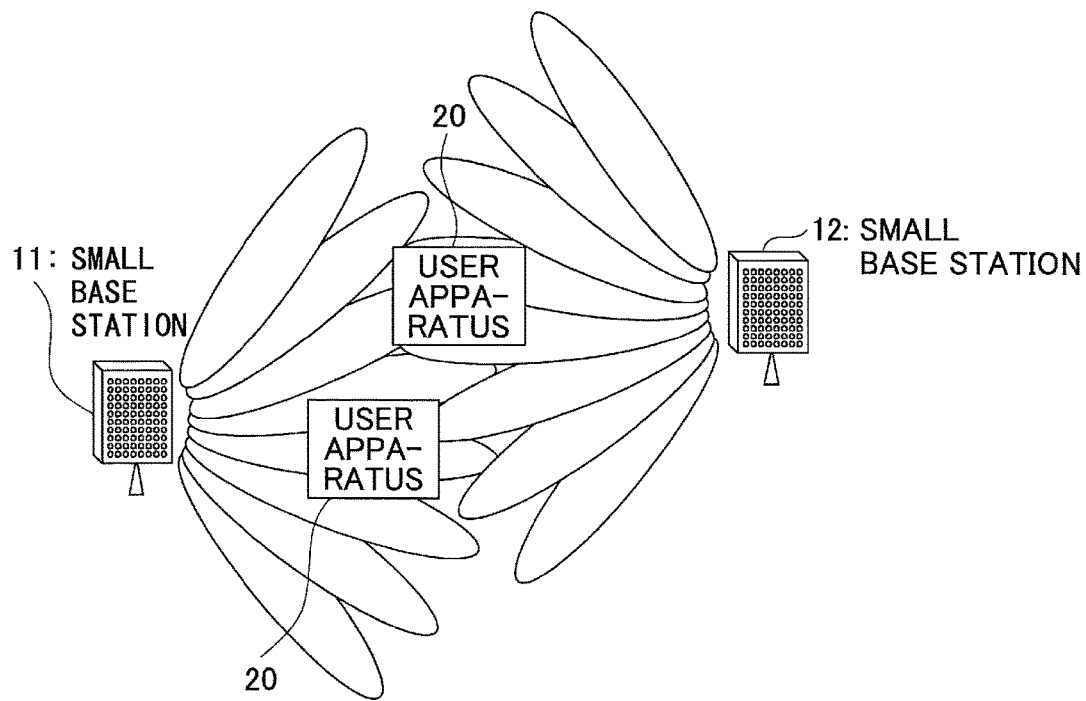
FIG. 4 is a diagram showing an image of discovery signals transmitted by a plurality of beams transmitted from small base stations.

FIG. 4 shows an image of a plurality of discovery signals each being transmitted by one bean from the small base station 11, 12. The discovery signal is used for specifying a beam in a rough and low-speed manner, and for establishing time/frequency synchronization with the small base station 11, 12. In general, since each beam for transmitting the discovery signal is wider than that for transmitting the measurement reference signal. Thus, there is a case where this is called "wide beam". Also, there is a case where the beam for transmitting the measurement reference signal is called "narrow beam".

In the present embodiment, it is assumed that the discovery signal is mapped to a predetermined radio resource densely at sparse time intervals. For example, the discovery signal may be transmitted at a frequency of once in 10~20 ms, for example. Also, since the discovery signal is also used for synchronization, the discovery signal is mapped densely such that the discover signal can be received with good quality as much as possible even at a place such as a cell edge far from the base station.

Also, there are various capabilities (bandwidths that can be used) of the user apparatus. Thus, the discovery signal is mapped within a narrow bandwidth that is a predetermined core such that the discovery signal can be detected by any user apparatus of any bandwidth. For example, the discovery signal is mapped to a frequency block of a predetermined bandwidth at a center part of the system bandwidth. The predetermine bandwidth is, for example, a bandwidth that a user apparatus of the smallest bandwidth uses.

Figure 5:
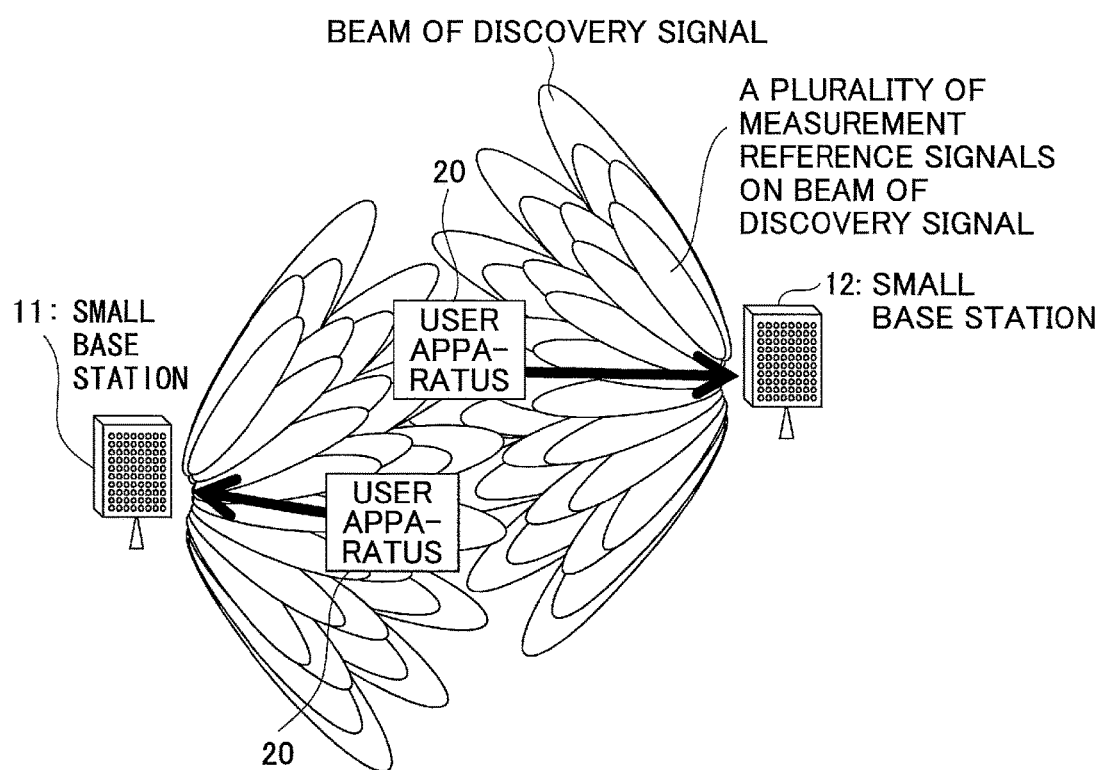
FIG. 5 is a diagram showing an image of measurement reference signals transmitted by a plurality of beams transmitted from small base stations.

Next, the measurement reference signal is described. FIG. 5 shows an image of measurement reference signals transmitted by a plurality of beams (narrow beams) from the base station 11, 12. FIG. 5 also shows beams of discovery signals. As shown in FIG. 5, the width of each narrow beam of the measurement reference signal is narrower than that of the beam (wide beam) of the discovery signal, so that a plurality of narrow beams corresponding to a wide beam are transmitted on the wide beam. To be transmitted on the wide beam means that, for example, the whole width of the plurality of narrow beams falls within the width of the wide beam. The measurement reference signal is used for specifying beams finely at high speed, and for dynamic rank adaptation (selection of optimum MIMO rank), link adaptation (optimum modulation/coding scheme determination and the like), scheduling, and the like, based on feedback information.

The measurement reference signal is also transmitted at sparse transmission timing like the discovery signal. Also, as to the frequency direction, in order to enable measurement over the whole band, the measurement reference signal is mapped to a wide band per 1 TTI (1 subframe).

That is, as to the measurement reference signal, for example, by transmitting it with low frequency like CSI-RS in LTE, overhead is made small. Also, the measurement reference signal supports an orthogonal polarization (Dual Polarized) antenna port. The orthogonal polarization antenna may be referred to as dual polarized antenna.

Figure 6:
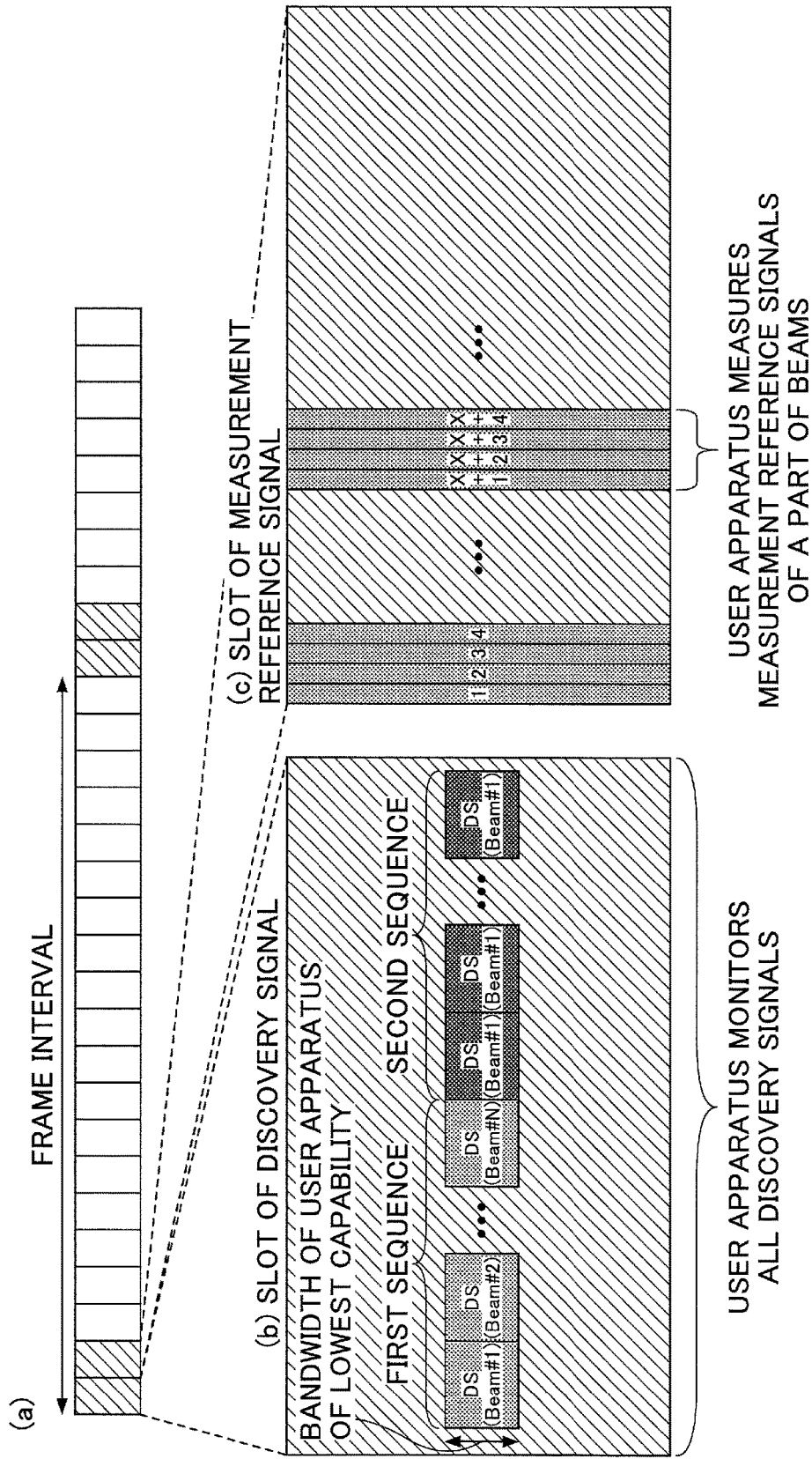
FIG. 6 is a diagram showing an example of mapping of a discovery signal and a measurement reference signal to radio resources.

FIG. 6 shows a mapping example of a discovery signal and a measurement reference signal. (a) in FIG. 6 shows a frame in the radio communication system of the present embodiment. Each square of the frame in FIG. 6(a) indicates a slot. The length of these frame and slot may be the same as that defined in the current LTE, or may be different from that defined in the current LTE. For example, the slot may be a subframe defined in LTE.

As shown in FIG. 6, in this example, the discovery signal is mapped to the top slot of the frame as shown in FIG. 6 (b). Also, the measurement reference signal is mapped in the second slot of the frame as shown in FIG. 6 (c). Then, this mapping is repeated for each frame. However, this is merely an example, and it may be mapped with higher frequency, or with lower frequency. Also, frequency for mapping to a slot may be different between the discovery signal and the measurement reference signal. Also, there may be a space (gap) between the slot of the discovery signal and the slot of the measurement reference signal.

As shown in FIG. 6 (b), in this example, the discovery signal is mapped to a center part of the system band with a predetermined bandwidth. As described before, this predetermined bandwidth is, for example, a bandwidth used by a user apparatus of the lowest capability. Also, in this example, a plurality of different wide beam reference signals are time-multiplexed. In the example of FIG. 6 (b), the same set of time-multiplexed discovery signals (beam 1-beam N) is transmitted two times. Accordingly, it is possible that the user apparatus performs correction of frequency error.

The user apparatus 20 reports, to the macro base station 10, information (identifier, index and the like) indicating a discovery signal of the best reception quality (example: discovery signal of the largest received power), for example. The information is, for example, information that can be obtained from the sequence of the discovery signal. Here, the information indicating the discovery signal is also information indicating a wide beam for transmitting the discovery signal. Although, in the example shown in FIG. 6 (b), discovery signals of a plurality of wide beams are time-multiplexed, they may be frequency-multiplexed in the frequency domain. That is, in this case, transmission is performed such that, the discovery signal 1 (wide beam 1) is transmitted by a frequency 1, a discovery signal 2 (wide beam 2) is transmitted by a frequency 2, . . . , or the like.

FIG. 6 (c) shows a mapping example of the measurement reference signal in the mapping slot of the measurement reference signal. In FIG. 6(c), the number of 1, 2, . . . , or the like is an identification number (index) of the measurement reference signal, and also is an identification number (index) of a narrow beam for transmitting the measurement reference signal. This may be referred to as beam ID. The identification number is, for example, information that can be obtained from the sequence of the measurement reference signal. As shown in FIG. 6(c), the measurement reference signal is mapped over the whole system band. This is for enabling the user apparatus to measure reception quality over the whole system band similarly to existing reference signals such as CSI-RS and the like.

In the example of FIG. 6 (c), each measurement discovery signal that is transmitted by a narrow beam is time-multiplexed while being associated with a wide beam for transmitting a discovery signal. That is, for example, the measurement reference signals 1~4 of the narrow beams 1~4 are associated with the discovery signal 1 of the wide beam 1, the measurement reference signals 5~8 of the narrow beams 5~8 are associated with the discovery signal 2 of the wide beam 2, . . . , and the measurement reference signals X+1~X+4 of the narrow beams X+1~X+4 are associated with the discovery signal X of the wide beam X. Within a resource of one measurement reference signal, a resource of the signal is mapped like a comb-shape for each antenna port, for example.

The user apparatus 20 receives, from the macro base station 10, for example, timing and sequence information of measurement reference signals corresponding to a discovery signal of the best reception quality as control information, so that the user apparatus 20 can monitor only a plurality of specific measurement reference signals. Alternatively, in addition to timing and sequence information of discovery signals in the macro coverage, the macro-assisted information may include timing and sequence information (that is, correspondence information between a discovery signal and a measurement reference signal) of measurement reference signals in the macro coverage. In such a case, after specifying a discovery signal (wide beam) of the best reception quality, the user apparatus 20 may receive a plurality of measurement reference signals corresponding to the discovery signal without reporting to the macro base station 10.

As shown in FIG. 6, the user apparatus 20 receives a discovery signal mapped only within a part of a frequency area, and receives a measurement reference signal mapped to a frequency area wider than the frequency area where the discovery signal is mapped. Also, the small base station 11, 12 transmits the discovery signal mapped only within a part of a frequency area, and transmits the measurement reference signal mapped to the frequency area wider than the frequency area to which the discovery signal is mapped.

Figure 7:
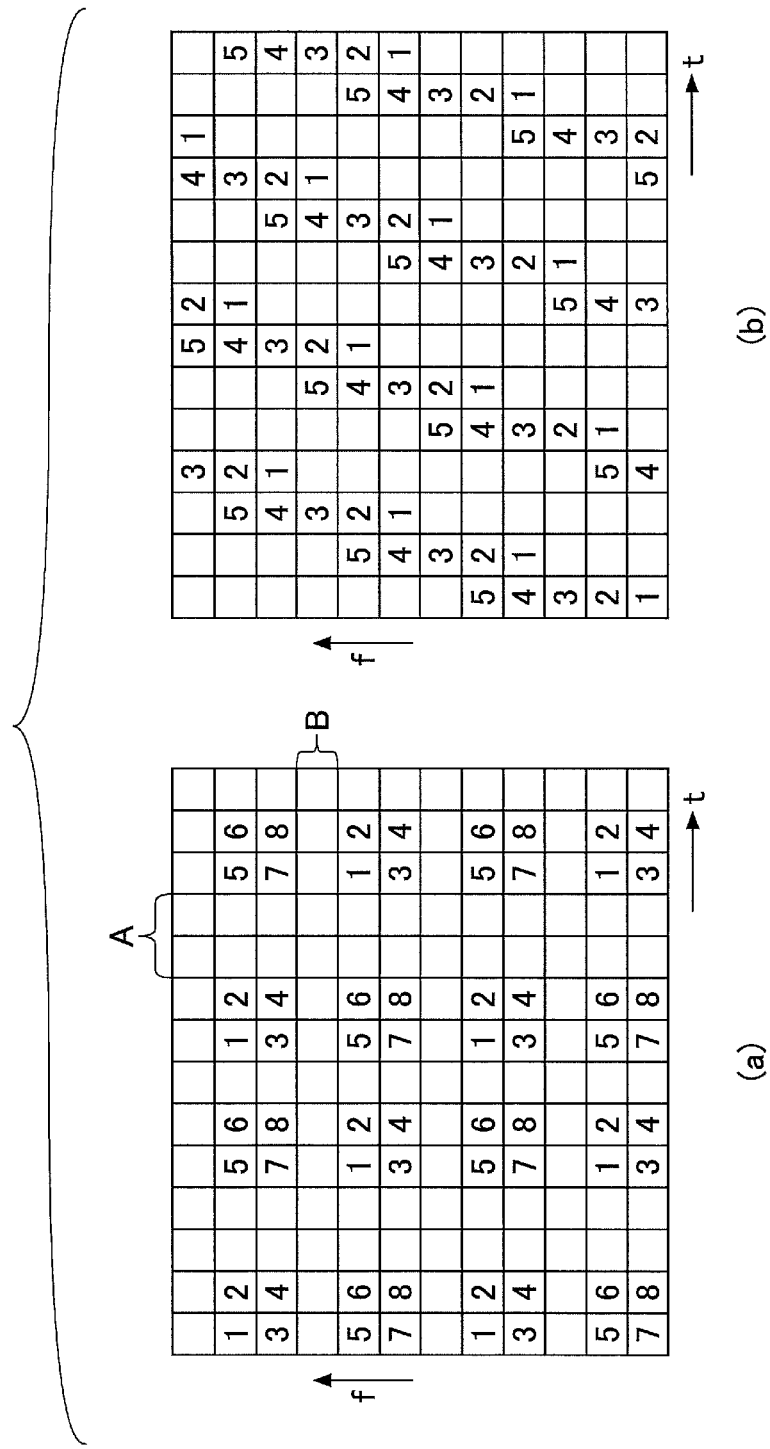
FIG. 7 is a diagram showing an example of mapping of a discovery signal to radio resources.

FIGS. 7 (a) and (b) is a diagram showing an example of mapping within a resource of the discovery signal. In the figure, a discovery signal is mapped to a resource element in which a number is described. Also, the number indicates distinction of beams or antenna ports. For example, in a case where the small base station transmits a discovery signal using eight antennas, resource elements for 8 antennas are used per 1 beam. When 8 beams are formed, signal mapping to 8×8=64 resource elements are performed. FIG. 7(a) shows such a mapping example. FIG. 7(a) is also an example of mapping method for forming a gap in the time direction and in the frequency direction. For example, mapping is not performed at a frequency element indicated by B, and mapping is not performed at symbols shown by A.

FIG. 7 (b) is an example in a case where mapping is performed to all resources in the time direction and in the frequency direction. In the case of FIG. 7 (b), there is no time/frequency resource that is not used at all as shown in FIG. 7 (a).

Although FIG. 7 (a), (b) shows an example of mapping of the discovery signal, similar mapping can be also used for the measurement reference signal.

(Operation Example of Radio Communication System)

Figure 8:
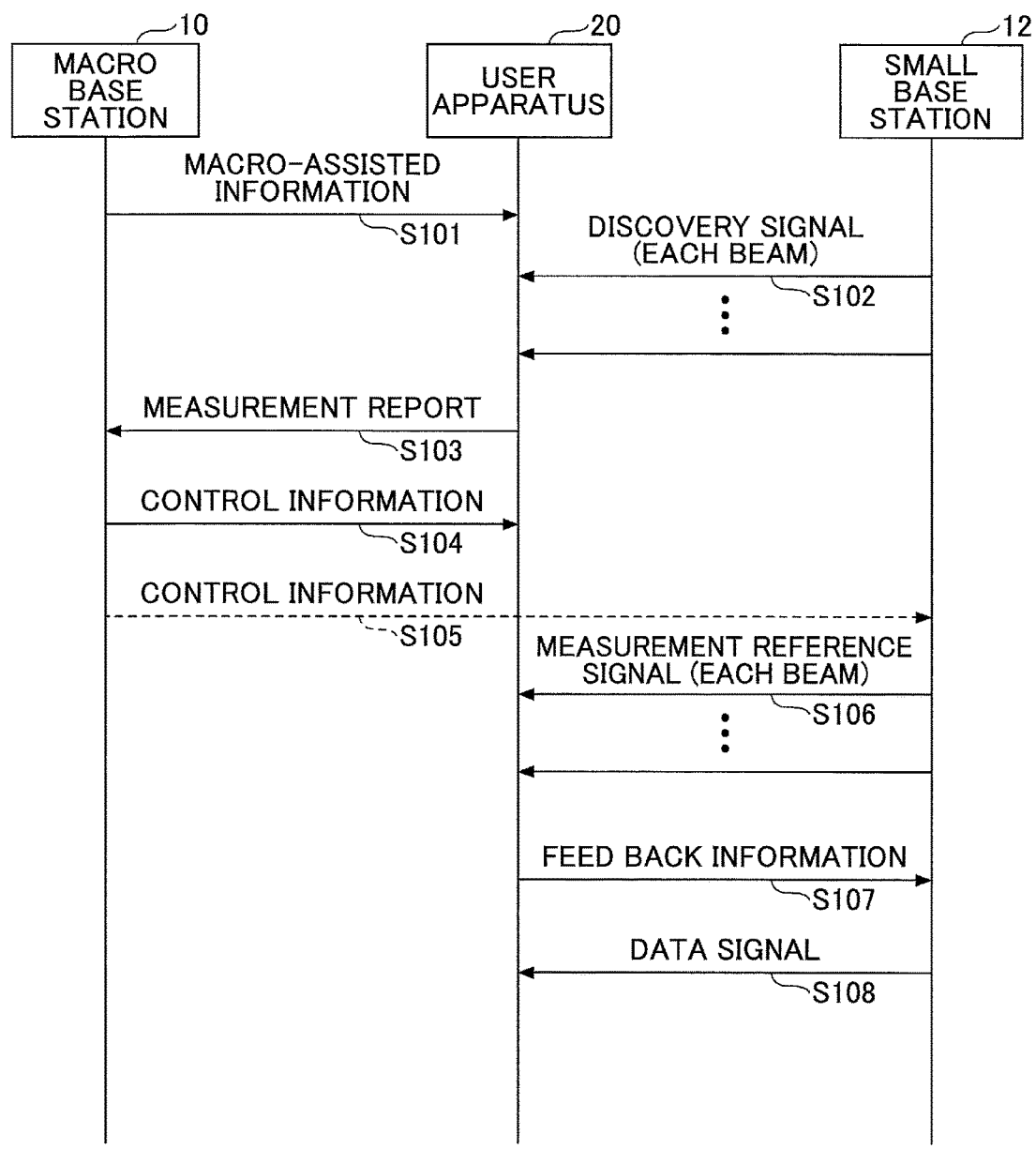
FIG. 8 is a sequence diagram showing operation of a radio communication system in the present embodiment.

Next, by mainly referring to FIG. 8, an operation example of the radio communication system (radio communication system shown in FIG. 2) of an embodiment of the present invention is described. In the example shown in FIG. 8, since the user apparatus 20 detects a discovery signal transmitted from the small base station 12 as a discovery signal of the best reception quality, the small base station 12 is shown in FIG. 8 from the small base station 11 and the small base station 12.

The macro base station 10 transmits macro-assisted information periodically, for example, to the user apparatus 20 residing in a coverage of the macro cell, so that the user apparatus 20 receives the macro-assisted information (step 101). It is assumed that the user apparatus 20 ascertains resources such as a transmission cycle, frequency and the like of the macro-assisted information by system information transmitted from the macro base station 10, for example.

As described before, the small base station 12 is transmitting a plurality of precoded discovery signals each forming a wide beam (step 102). The user apparatus 20 ascertains transmission timing and sequence (including information such as identifier, index and the like) of each discovery signal based on the macro-assisted information received in step 101. Thus, by using these, the user apparatus 20 receives each discovery signal transmitted from the small base station 12 so as to measure reception quality (received power and the like). That is, by using the macro-assisted information, candidates of identifiers (beams) used for measuring the plurality of discovery signals are restricted.

The discovery signal has a function similar to that of the synchronization signal (SS) in LTE, so that the user apparatus 20 establishes frequency synchronization, and establishes timing synchronization (symbol synchronization, frame synchronization and the like), with the small base station 12 by receiving the discovery signal. Also, by the discovery signal, the user apparatus 20 may receive information (minimum system information and the like) necessary for communication in the coverage of the small base station 12.

The user apparatus 20 measures reception quality (received power and the like) for the detected discovery signals so as to transmit a measurement result to the macro base station 10 as a measurement report (step 103). The measurement report includes identification information (identifier, index and the like) of discovery signals that can be received, and reception quality (example: received power and the like) of each discovery signal. Although the type of the channel used for the measurement report is not limited, a physical uplink shared channel (PUSCH) can be used. By the way, for example, the user apparatus 20 may transmit a measurement report only for a discovery signal of the highest reception quality. Further, for example, the user apparatus 20 may transmit a measurement report for a predetermined number of discovery signals from that of higher reception quality.

The macro base station 10 that receives the measurement report for the discovery signals specifies a discovery signal (wide beam) that the user apparatus 20 received with the best quality base on the measurement report so as to determine (assign) a small base station 12 corresponding to the discovery signal and a measurement reference signal that the user apparatus 20 should receive. Then, the macro base station 10 reports, to the user apparatus 20, control information including identification information (ID and the like of the small cell) of the small base station 12, timing and sequence and the like of measurement reference signals that the user apparatus 20 should receive (step 104). When the radio communication system supports carrier aggregation, the notification of identification information of the small base station 12 may be performed as assignment of an SCell. That is, in this case, the user apparatus 20 performs communication by simultaneously using a PCell (cell formed by a primary component carrier) formed by the macro base station 10 and an SCell (a cell formed by a secondary component carrier) formed by the small base station 12.

Also, the macro base station 10 may transmit the above-mentioned assignment information (identification information of the small base station 12 that the user apparatus 12 communicates with, assignment information of SCell, information of measurement reference signals that the user apparatus 20 should receive) to the small base station 12 via a backhaul circuit (step 105). But, this operation is not essential. For example, when assignment information is not transmitted via the backhaul circuit, the small base station 12 transmits all measurement reference signals, so that the small base station 12 assigns a narrow beam for data signal communication to the user apparatus 20 based on feedback information from the user apparatus 20 that ascertains a measurement reference signal (narrow beam) that should be received.

By receiving the assignment information via the backhaul circuit, the small base station 12 can perform operation of the SCell in the carrier aggregation and perform operation not to transmit a measurement reference signal to a direction where the user apparatus does not exist, and the like.

The user apparatus 20 that receives the control information in step 104 can receive a restricted number of measurement reference signals that are transmitted by narrow beams.

The user apparatus 20 receives a plurality of measurement reference signals of each narrow beam transmitted from the small base station 12 (step 106), performs measurement of reception quality (received power and the like), selects a specific measurement reference signal based on reception quality, so as to transmit feedback information including identification information such as a number of the selected measurement reference signal to the small base station 12 using an uplink channel (step 107). In the above-mentioned selection, a signal of the best reception quality may be selected, or a predetermined number of signals from higher reception quality may be selected, or selection is performed using another method. Also, the feedback information may include CSI such as CQI, rank and the like instead of the received power or in addition to the received power. The small base station 12 determines a narrow beam for transmitting a data signal and the like (PDSCH, EPDCCH and the like) to the user apparatus 20 based on the feedback information so as to perform communication in downlink by the narrow beam.

Figure 9:
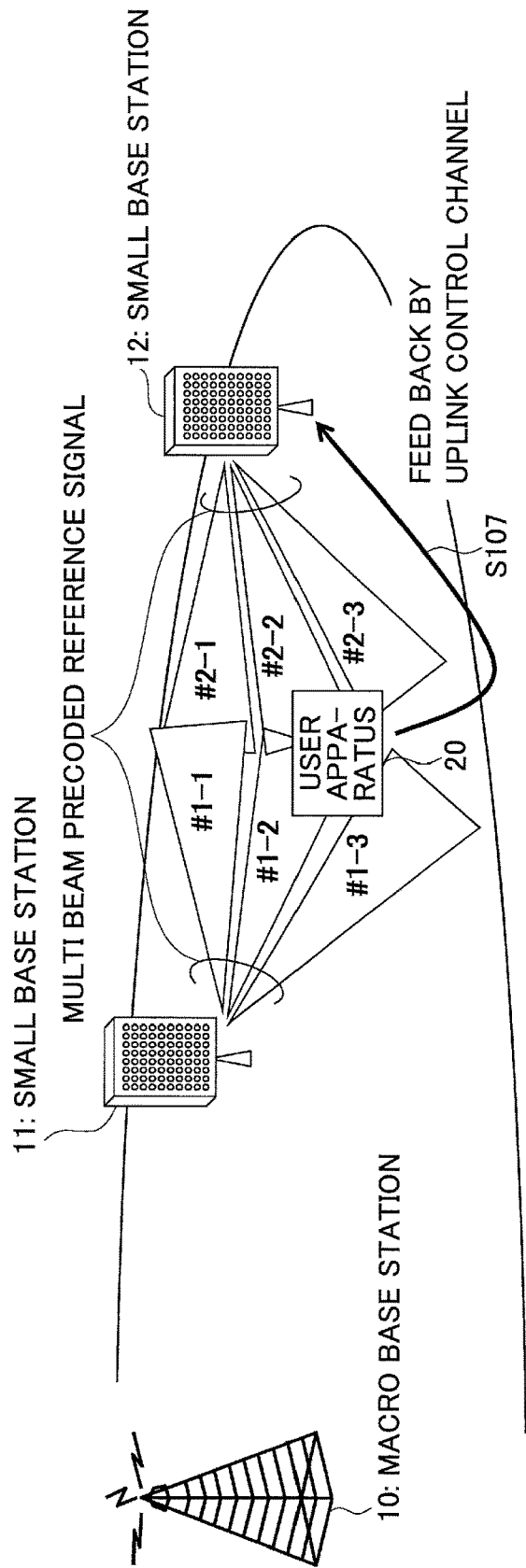
FIG. 9 is a diagram showing transmission of feedback information in a radio communication system.

As the uplink channel for transmitting the feedback information by the user apparatus 20, for example, a physical uplink control channel (PUCCH/EPUCCH) defined in LTE or a random access channel (PRACH) can be used, but, the channel is not limited to these. Also, as to the resource for the uplink channel, it may be assigned from the macro base station 10, or, it may be assigned from the small base station 12 after being synchronized with the small base station 12 by the discovery signal. The transmission of feedback information here is also shown as step 107 in FIG. 9.

The small base station 12 that receives the feedback information performs scheduling so as to determine a beam, rank, MCS (modulation scheme/coding rate), resource and the like, and transmit a data signal (step 108). More specifically, before the step 108, assignment information may be transmitted from the small base station 12 to the user apparatus 20 by a control channel.

Figure 10:
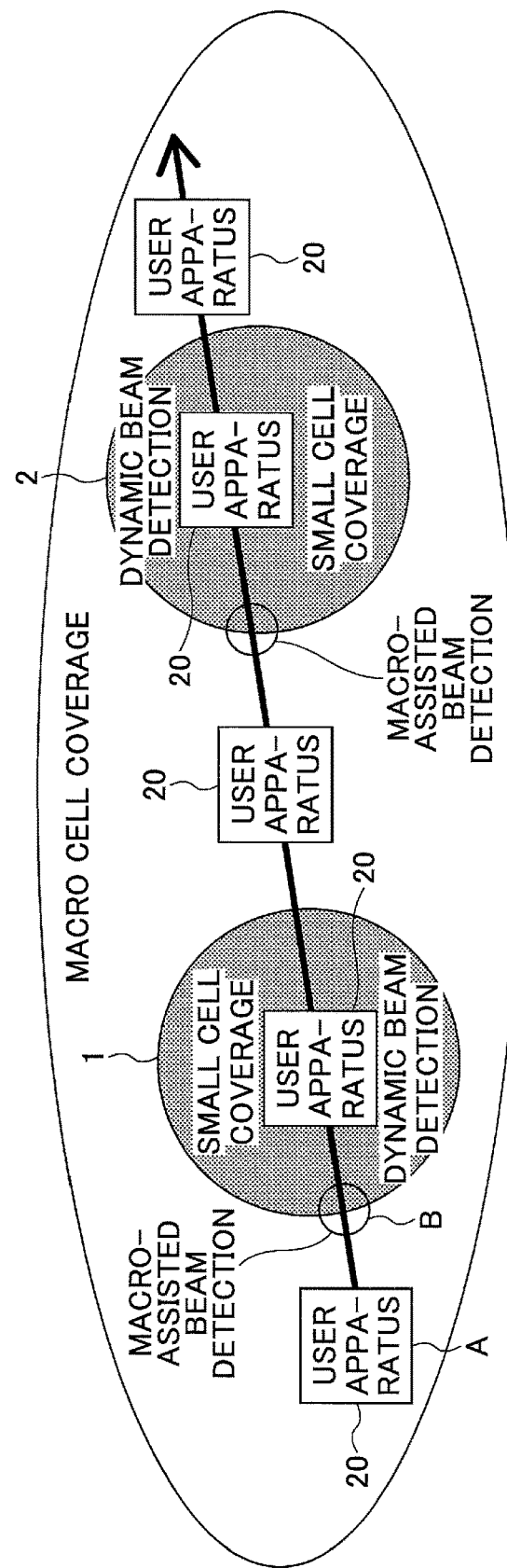
FIG. 10 is a diagram showing a situation in which a user apparatus moves in a communication environment where small cells exist in a macro cell.

FIG. 10 is a diagram showing states in a case where the user apparatus 20 moves in a communication environment in which the radio communication system of the present embodiment is used. That is, FIG. 10 shows a situation in which the user apparatus 20 moves in a coverage of the macro cell, and passes through two small cells.

As shown in FIG. 10, the user apparatus 20 existing at the A point moves to reach an entry (B point) of a coverage of the small cell 1. The user apparatus 20 searches for discovery signals at predetermined intervals based on the macro-assisted information, so that the user apparatus 20 detects a discovery signal transmitted by a predetermined wide beam of the small cell 1 at the time point when the user apparatus 20 reaches the B point. Accordingly, based on the before-mentioned operation, the user apparatus 20 receives, on the wide beam, measurement reference signals transmitted by narrow beams, and returns feedback information, so that proper resource assignment and beam selection are performed, and communication of a data signal is performed. In the coverage of the small cell 1, switching of narrow beams (wide beams as necessary) is dynamically performed, so that the user apparatus 20 can continue communication by a proper beam while moving.

When the user apparatus 20 goes out of the coverage of the small cell 1, only communication with the macro cell is performed. At this time, like the operation at the A point, the user apparatus 20 searches for discovery signals, and detects a discovery signal when entering a coverage of a small cell 2. Operation hereinafter is the same as operation in the coverage of the small cell 1.

Other Examples

In the example described so far, the macro base station 10 exists, and the user apparatus 20 receives macro-assisted information from the macro base station 10, and transmits a measurement report to the macro base station 10. However, a configuration can be adopted in which the macro base station 10 does not exist.

Figure 11:
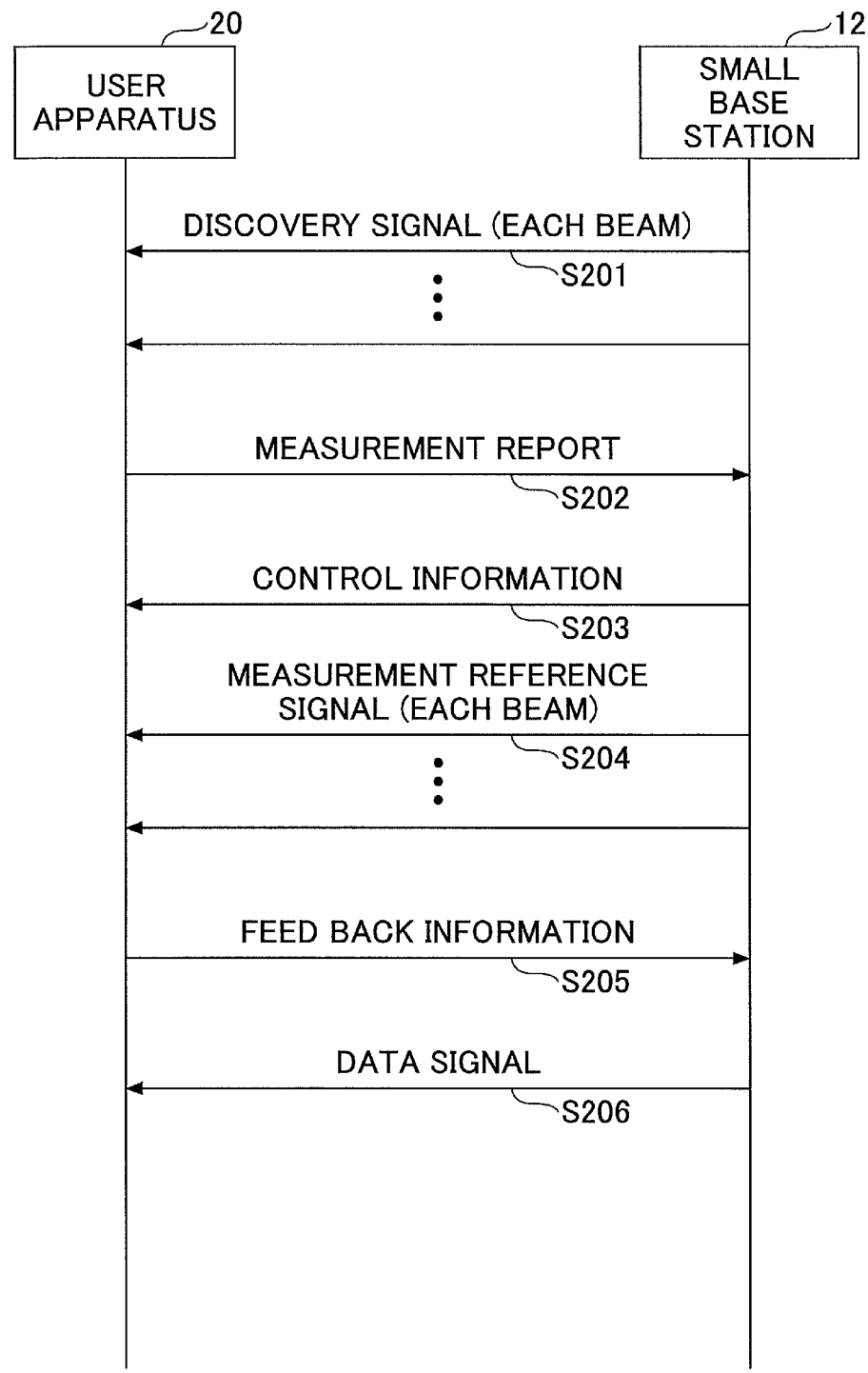
FIG. 11 is a sequence diagram showing operation in a case where the macro base station 10 does not exist.

An operation example in a case where the macro base station 10 does not exist is described with reference to a sequence diagram of FIG. 11. The example of FIG. 11 shows a case where the macro base station 10 does not exist, or, a case where the user apparatus 20 is out of a coverage of the macro base station 10, and the user apparatus 20 can communicate with the small base station 12.

In this example, for example, it is assumed that assistance information corresponding to the macro-assisted information is stored in the user apparatus 20 beforehand. As described before, the small base station 12 is transmitting a plurality of precoded discovery signals each forming a wide beam (step 201). The user apparatus 20 ascertains transmission timing and sequence of each discovery signal based on the assistance information. Thus, by using these, the user apparatus 20 receives each discovery signal transmitted from the small base station 12. The user apparatus 20 establishes frequency synchronization, and establishes timing synchronization (symbol synchronization, frame synchronization and the like), with the small base station 12 by receiving the discovery signal. Also, by the discovery signal, the user apparatus 20 may receive information (minimum system information and the like) necessary for communication in the coverage of the small base station 12.

The user apparatus 20 measures reception quality (received power and the like) for the received discovery signals so as to transmit a measurement result to the small base station 12 as a measurement report (step 202). The measurement report includes identification information (identifier, index and the like) of discovery signals that can be received, and reception quality (example: received power and the like) of each discovery signal. For example, the user apparatus 20 may transmit a measurement report only for a discovery signal of the highest reception quality. Further, for example, the user apparatus 20 may transmit a measurement report for a predetermined number of discovery signals from that of higher reception quality.

The small base station 12 that receives the measurement report for the discovery signals specifies a discovery signal (wide beam) that the user apparatus 20 received with the best quality base on the measurement report so as to determine (assign) measurement reference signals, corresponding to the discovery signal, that the user apparatus 20 should monitor. Then, the small base station 12 reports, to the user apparatus 20, control information including timing and sequence and the like of measurement reference signals that the user apparatus 20 should receive (step 203). When the user apparatus 20 holds correspondence information between discovery signals and measurement reference signals, the user apparatus 20 may receive measurement reference signals as follows without performing the above-mentioned measurement report transmission and control information reception.

The user apparatus 20 that receives the control information in step 203 can monitor a restricted number of measurement reference signals that are transmitted by narrow beams. The user apparatus 20 receives a plurality of measurement reference signals of each narrow beam transmitted from the small base station 12 according to the control information (step 204), performs measurement of reception quality (received power, CQI and the like), so as to transmit feedback information including, for example, identification information of the best measurement reference signal to the small base station 12 using an uplink channel (step 205). Operation after that is the same as that described in FIG. 8.

(Concrete Example of Discovery Signal, Measurement Reference Signal, Beam Forming and the Like)

As described above, examples of discovery signals and measurement reference signals, and operation examples using these have been explained. In the following, more concrete examples on the content of these signals and beamforming are described.

As described before, the small base station 11, 12 (hereinafter, for simplifying description, these are simply referred to as "base station" in the description of the concrete examples) transmits a discovery signal by a wide beam and transmits a measurement reference signal by a narrow beam so as to enable hierarchical search of narrow beams. Also, as described before, a synchronization signal can be used as a discovery signal. In this concrete example, it is assumed that the discovery signal is a synchronization signal (PSS/SSS).

Figure 12:
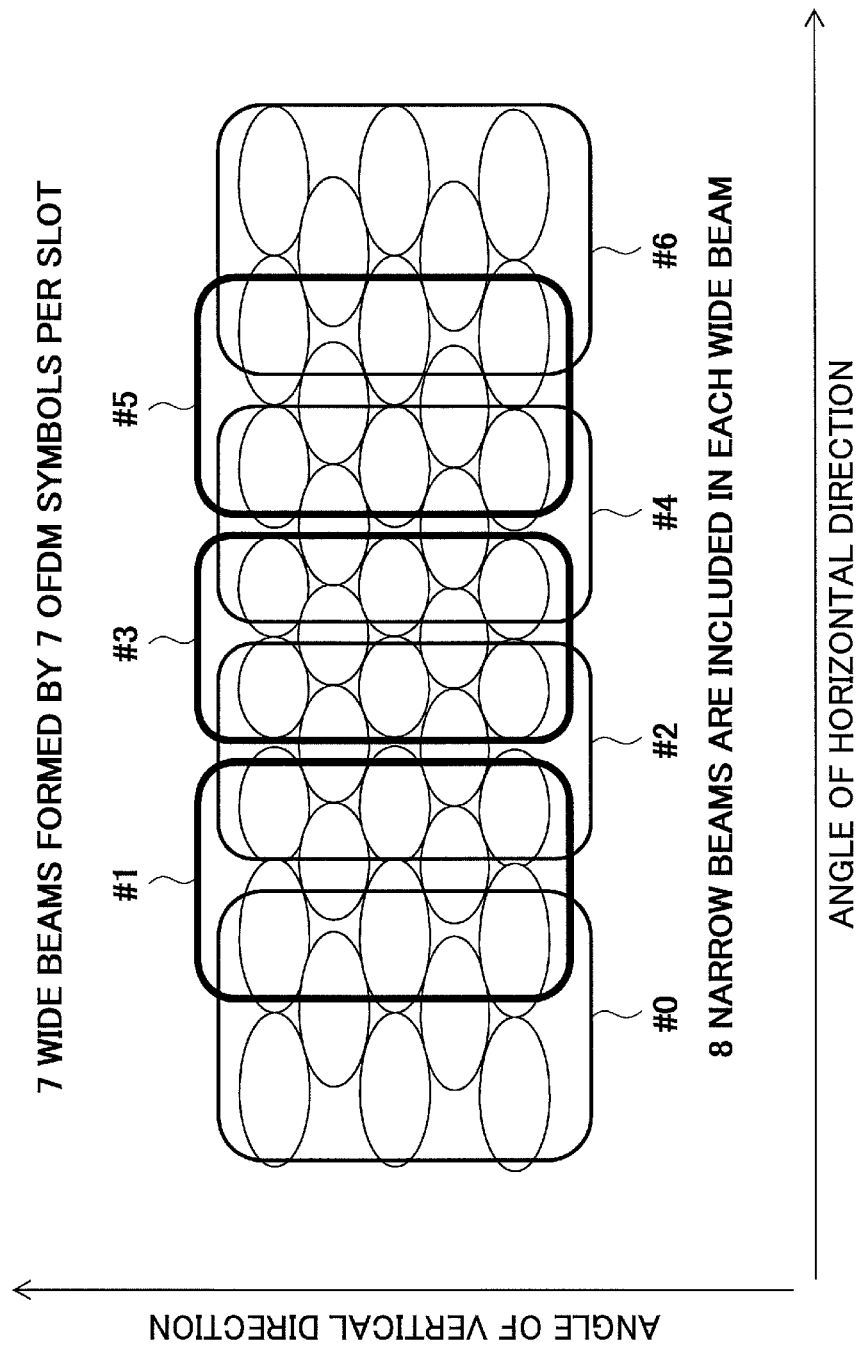
FIG. 12 is a diagram showing an example 1 of beams of discovery signals and beams of measurement reference signals.
Figure 13:
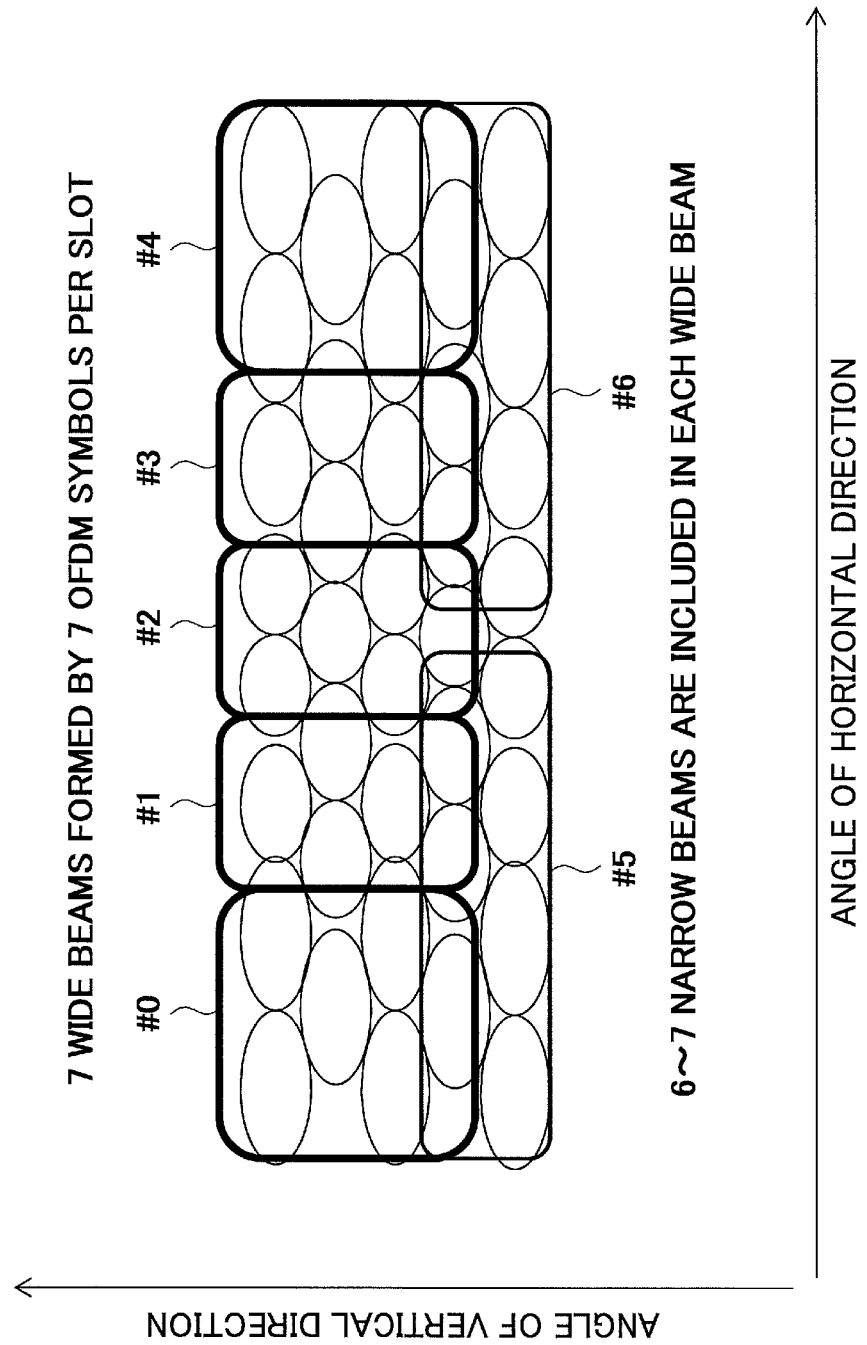
FIG. 13 is a diagram showing an example 2 of beams of discovery signals and beams of measurement reference signals.

FIG. 12 and FIG. 13 show concrete examples showing with what shape the beam of the discovery signal and the beam of the measurement reference signal are transmitted.

FIG. 12 and FIG. 13 show directions of beams viewing from antennas of the base station. As shown in the figure, the lateral direction indicates a horizontal direction angle, and longitudinal direction indicates a vertical direction angle.

FIG. 12 shows an example in a case where the base station transmits discovery signals using 7 wide beams and transmits measurement reference signals using 8 narrow beams in each wide beam. As shown in FIG. 12, wide beams are shaped such that they are arranged in the horizontal direction while a part is overlapping. As an example, 1 wide beam is transmitted by 1 OFDM symbol, and the wide beams #0~#6 shown in FIG. 12 are transmitted in 1 slot (7 symbols). This point also applies to the case of FIG. 13. In this concrete example, an ID of a beam of a reference signal is referred to as beam group ID, and an ID of a beam of a measurement reference signal is referred to as beam ID. The beam group ID can be obtained from the sequence of a discovery signal (PSS/SSS), and the beam ID can be obtained from a sequence of the measurement reference signal.

FIG. 13 shows another example in a case where the base station transmits discovery signals using 7 wide beams and transmits measurement reference signals using 8 narrow beams in each wide beam. In the example shown in FIG. 13, wide beams #0~#4 in the wide beams #0~#6 are formed in the upper side of the vertical direction, and wide beams #5~#6 are formed in the lower side of the wide beams #0~#4 such that width of the vertical direction is narrower than that of #0~#4 and width of the horizontal direction is wider than that of #0~#4. According to the shape shown in FIG. 13, for example, a user of a cell edge can be covered effectively.

As mentioned above, in this concrete example, PSS/SSS is used as a discovery signal. For example, PSS is used for obtaining symbol timing synchronization, and SSS is used for obtaining radio frame synchronization. But, the usage is not limited to these.

Examples of allocation of sequences of PSS and sequences of SSS among sites are described with reference to FIG. 14 and FIG. 15.

Figure 14:
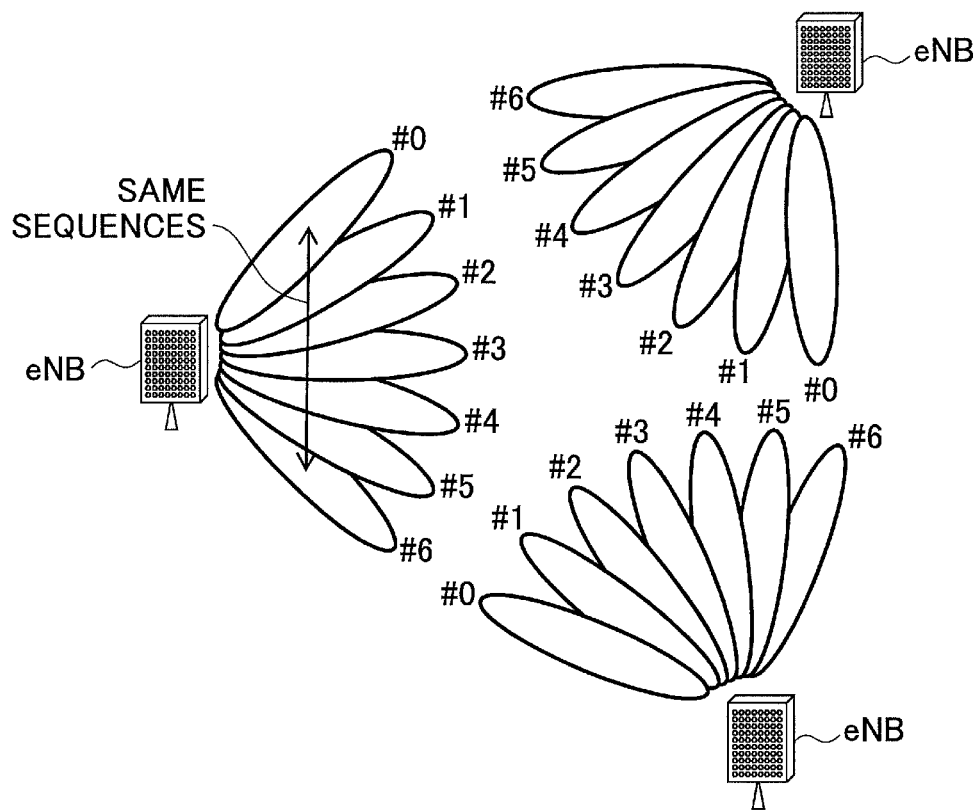
FIG. 14 is a diagram for explaining an example of sequence assignment in PSS.

As shown in FIG. 14, in the same site (the same meaning as "the same base station"), sequences of the PSS are the same for all symbols (7 symbols in the before-mentioned example). Among a plurality of sites, sequences may be the same or may be made different for each site. FIG. 14 shows a case where sequences are the same among a plurality of sites.

Figure 15:
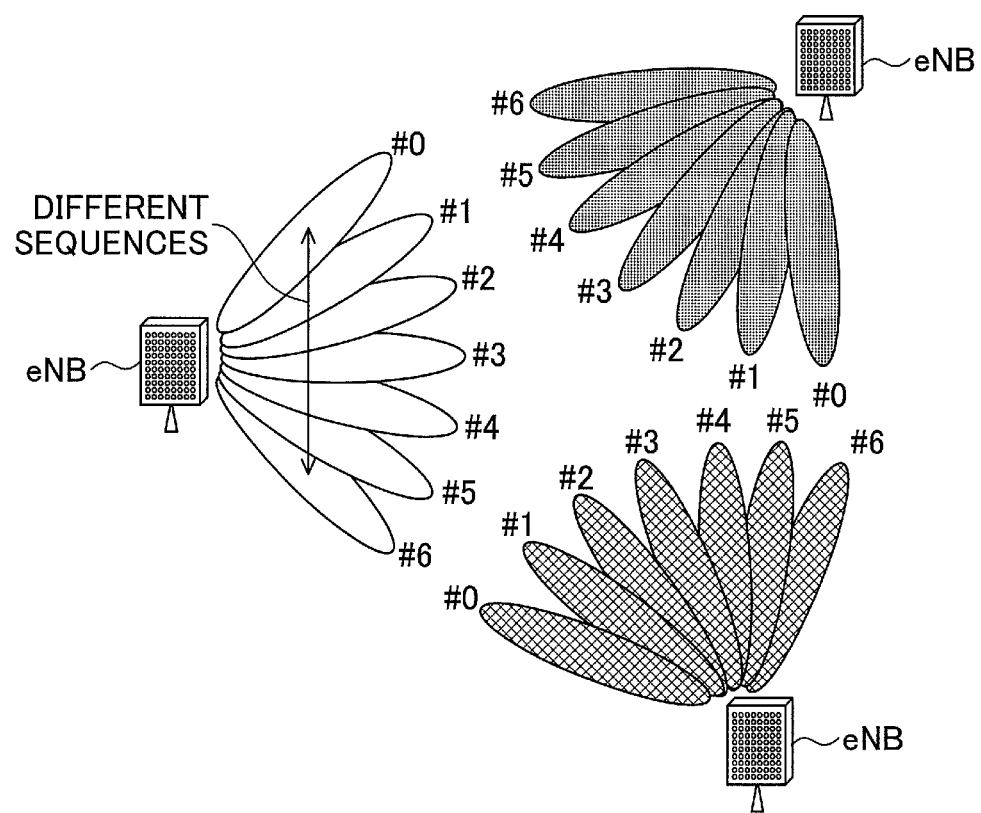
FIG. 15 is a diagram for explaining an example of sequence assignment in SSS.

As shown in FIG. 15, in the case of SSS, sequences are made different among symbols (beams). Among a plurality of sites, sequences may be the same or may be made different for each site. FIG. 15 shows a case where sequences are made different for each site. As to search of a beam group ID, for example, it can be considered that, combination of PSS/SSS of FIG. 14 and FIG. 15 is adopted, PSS (1 sequence) is used for initial synchronization, and SSS (different among beams) is used for detection of the beam group ID.

Also, as an example, in a case where 3 types of sequences of PSS are defined and 168 sequences of SSS are defined in the system, 504 beam group IDs can be used in total.

<On Beam ID Search>

As described so far, the discovery signal and the measurement signal are in a hierarchical relationship, so that, when the user apparatus 20 receives a good discovery signal by a wide beam, the user apparatus 20 performs operation to receive a plurality of measurement signals corresponding to it by a plurality of narrow beams, select a specific measurement reference signal and to return a feedback for it to the base station. Since this operation corresponds to searching for a beam ID of a beam of a measurement reference signal that can be received with good quality, this operation can be called beam ID search.

Figure 16:
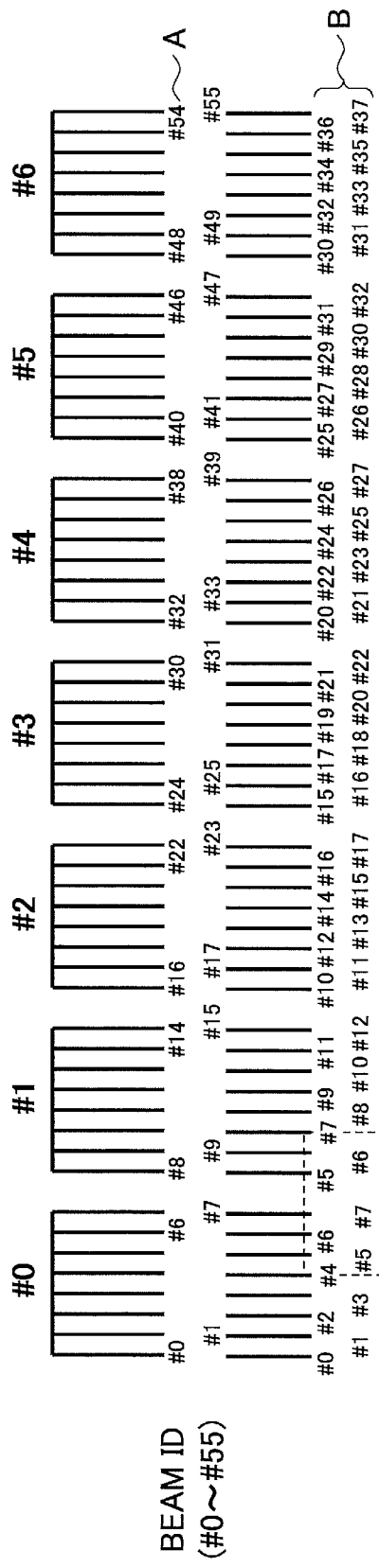
FIG. 16 is a diagram showing a detailed example of a hierarchical structure of beams.

FIG. 16 shows an example of hierarchical structure of beam ID search in a case where, as shown in FIG. 12 and the like, 7 wide beams and 8 narrow beams per 1 wide beam are formed.

As shown in FIG. 16, each of beam IDs: #0~#6 corresponding to 7 wide beams is associated with 8 beam IDs corresponding to 8 narrow beams (#0~#55 in total) (shown by A in FIG. 16). However, as shown in FIG. 12, since overlapping is allowed for the wide beam, a case may occur, for example, where beam IDs #5~7 under a beam group ID #0 are the same as beam IDs #8~10 under a beam group ID #1. In such a case, the base station may perform management of IDs by performing ID assignment to assign beam IDs #5~7 to the beam IDs #8~10 under the beam group ID #1. "B" in FIG. 16 indicates such an example of ID assignment.

By the way, in the description so far, as a beam of a measurement reference signal used for beam ID search, a narrow beam narrower than a beam for a discovery signal is used. However, this is merely an example, and beam for the measurement reference signal may be a wide beam similar to the beam of the reference signal.

By using a wide beam as a beam for the measurement reference signal, since each beam covers a wider range than that of the narrow beam, robustness against mobility improves compared with the narrow beam. Also, compared with the case of the narrow beam, complexity of beam search is reduced. As to beamforming gain and coverage, the narrow beam is better than the wide beam. However, by increasing resources assigned to the measurement reference signal when using the wide beam, beam forming gain and coverage can be improved. Also, in the case of wide beam, compared with the case of the narrow beam, the number of signals to measure is reduced, so it is good that the information amount for measurement reporting (feedback) is small.

Figure 17:
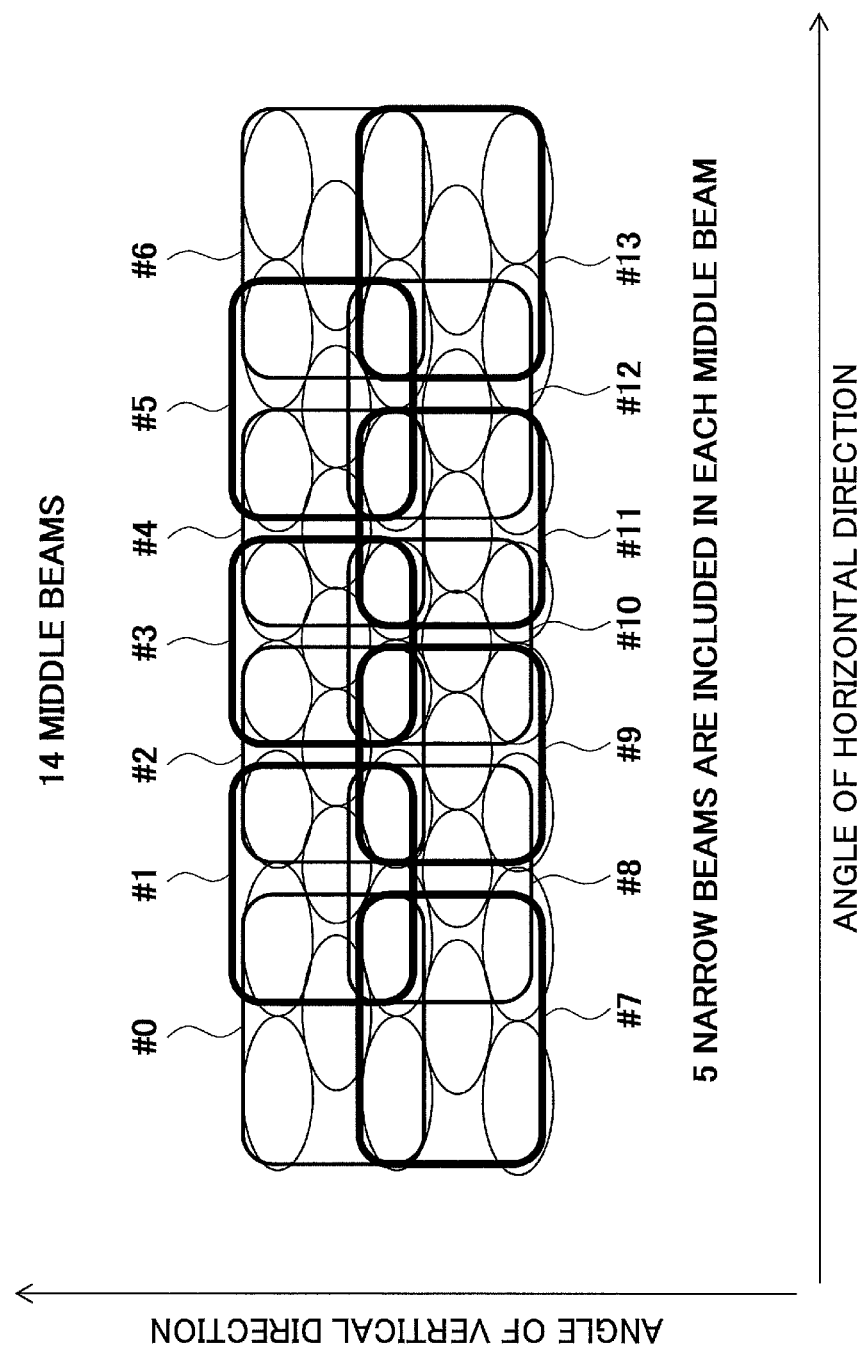
FIG. 17 is a diagram showing an example of beams of middle width.

The beam for transmitting the measurement reference signal is not limited to the wide beam and the narrow beam, and a middle beam which is a beam of an intermediate width of these may be used. FIG. 17 shows an example of a case where the middle beam is used. In the example of FIG. 17, 14 middle beams of #0~#13 are used. In this case, each middle beam includes 5 narrow beams. Such a grouping of beams can be applied to a case where super massive MIMO and the like having enormous number of antenna elements is used, for example.

<Example of Mapping of PSS/SSS, Measurement Reference Signal>

As a mapping example of radio resources for the discovery signal and the measurement reference signal, an example shown in FIG. 6 has already been described. Here, a mapping example is described in a concrete example in which PSS/SSS is used as a discovery signal.

Figure 18:
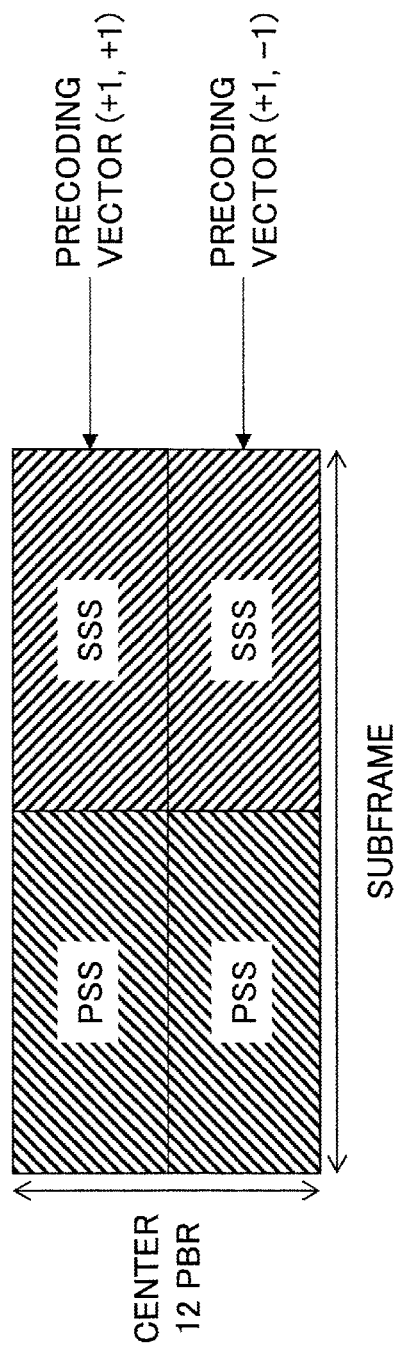
FIG. 18 is a diagram showing a mapping example of PSS/SSS.

FIG. 18 is a diagram showing a mapping example of PSS/SSS. As shown in FIG. 18, PSS and SSS are assigned to resource blocks of a center part of the system band. Although the same sequences are used for PSS/SSS of the upper half of FIG. 18 and PSS/SSS of the lower half, in order to obtain transmission diversity, the upper half and the lower half in the frequency region are multiplied by different precoding vectors. In this example, the base station is provided with dual polarized antennas, so that the precoding vector is applied to an antenna port of vertical polarization and an antenna port of a horizontal polarization in the dual polarized antennas.

In the example shown in FIG. 18, like the case of FIG. 6 (b), PSS is transmitted by different wide beams in units of symbols, and also, SSS is transmitted by different wide beams in units of symbols. However, this is an example, and the configuration is not limited to this.

Figure 19:
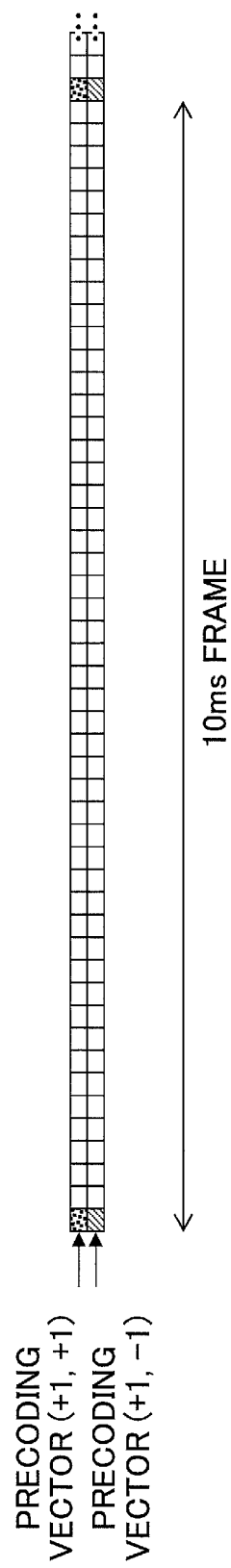
FIG. 19 is a diagram for explaining an example of transmission interval of PSS/SSS.

FIG. 19 is a diagram showing an example of transmission intervals of PSS/SSS. As shown in FIG. 19, in this example, they are transmitted with an interval once in a frame of 10 ms. As shown in FIG. 18 and FIG. 19, by transmitting PSS/SSS in one subframe by providing transmission diversity, the user apparatus 20 can detect PSS/SSS quickly.

Figure 20:
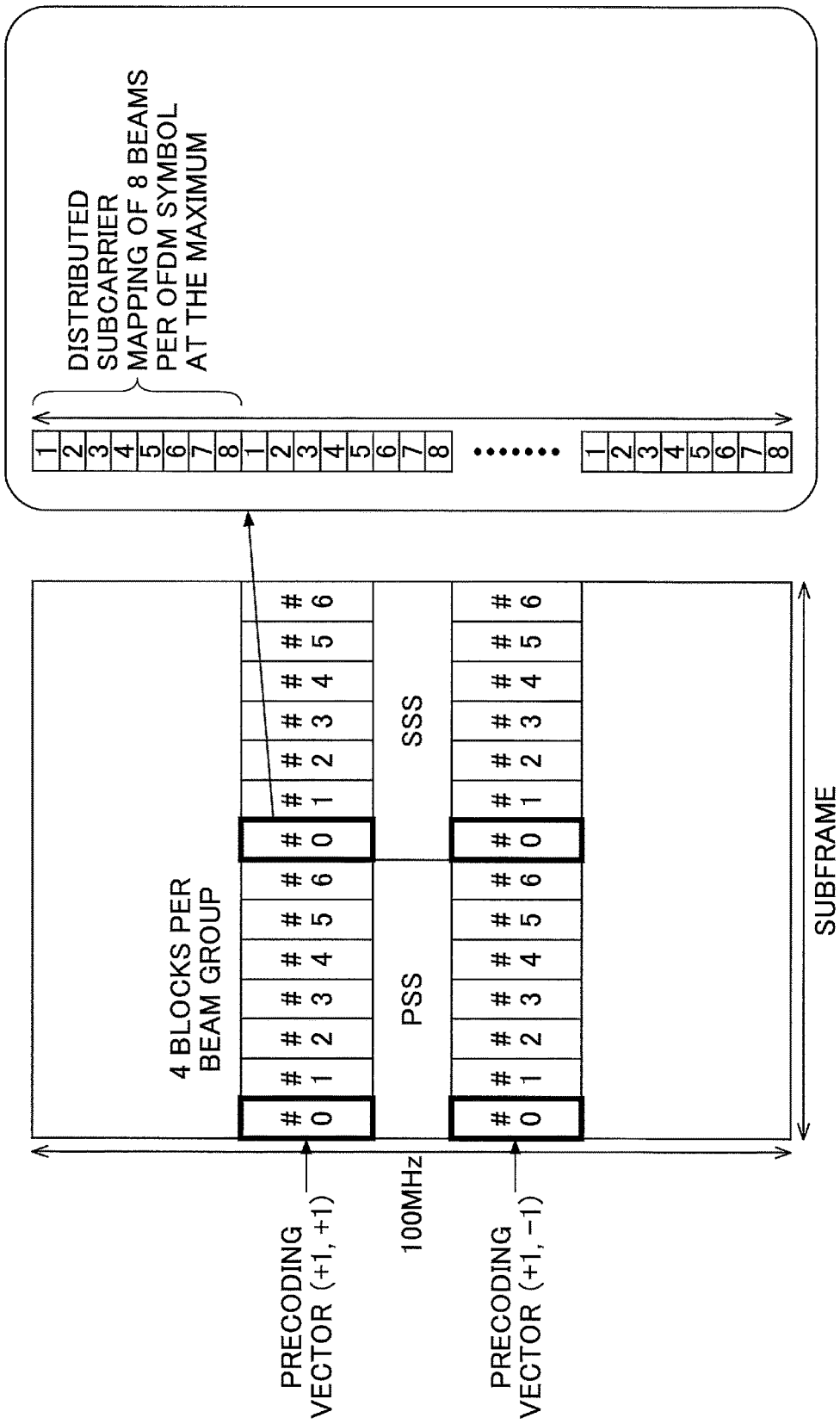
FIG. 20 is a diagram showing a mapping example of a measurement reference signal.

FIG. 20 shows a mapping example of the measurement reference signal in a case where PSS/SSS like the abovementioned example is used. As shown in FIG. 20, in this example, measurement reference signals that are transmitted by a plurality of narrow beams belonging to a beam group ID for transmitting PSS are mapped above and below the PSS. The measurement reference signals mapped above and below the PSS have the same sequence. By multiplying the measurement reference signals mapped above and below PSS by different precoding vectors, transmission diversity is obtained.

Similarly, measurement reference signals that are transmitted by a plurality of narrow beams belonging to a beam group ID for transmitting SSS are mapped above and below the SSS. The measurement reference signals mapped above and below the SSS have the same sequence. By multiplying the measurement reference signals mapped above and below SSS by different precoding vectors, transmission diversity is obtained.

That is, in the mapping example shown in FIG. 20, 4 measurement reference signal blocks are mapped (above and below PSS, above and below SSS) per one beam group. The numbers of #0~#6 in FIG. 20 indicate beam group IDs respectively. Measurement reference signals transmitted by a plurality of narrow beams belonging to a beam group of a number are mapped to a resource of each block to which the number is assigned An example of signal mapping inside each block (the time length is 1 symbol) is shown in the right side of FIG. 20. In the example of FIG. 20, a number indicates a beam (measurement reference signal) on which a signal is transmitted by the resource. In the example of FIG. 20, 8 beams (8 measurement reference signals) are distributed and mapped to subcarriers. Although a band width of one block is not limited to a particular value, it is 14 resource block length, for example.

Figure 21:
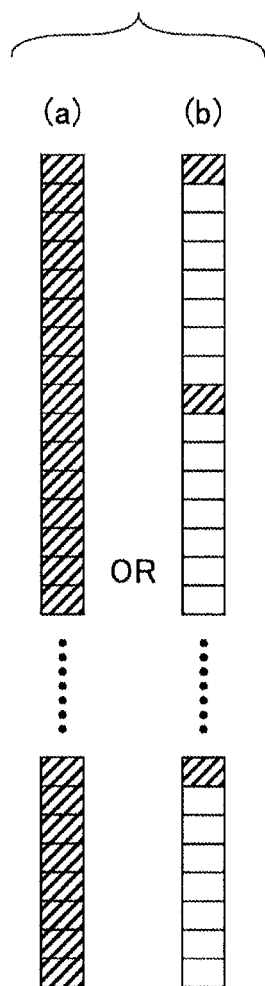
FIG. 21 is a diagram showing a mapping example of a wide beam.

The example of the right side of FIG. 20 is an example in a case where 8 narrow beams (measurement reference signals) belong to 1 wide beam (PSS/SSS). FIG. 21 shows a mapping example in a case where one wide beam (measurement reference signal) belongs to one wide beam (PSS/SSS). In this case, the beam for the PSS/SSS is the same as the beam for the measurement reference signal. As to resource mapping, it may be continuous subcarrier mapping as shown in FIG. 21 (a), or it may be distributed mapping as shown in FIG. 21 (b). In a case where distributed mapping is adopted, power boosting (power increase) may be adopted for the assigned subcarrier.

Figure 22:
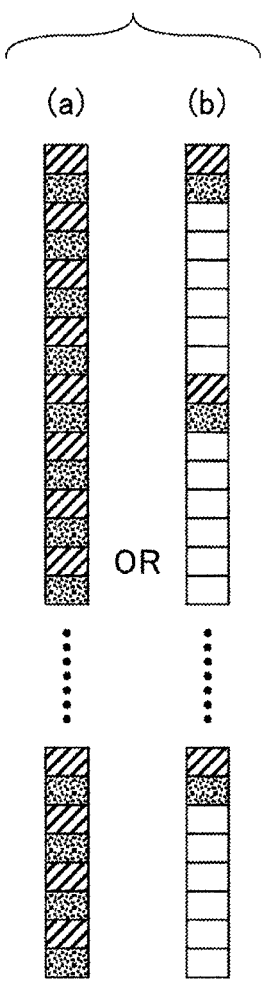
FIG. 22 is a diagram showing a mapping example of a middle beam.
Figure 23:
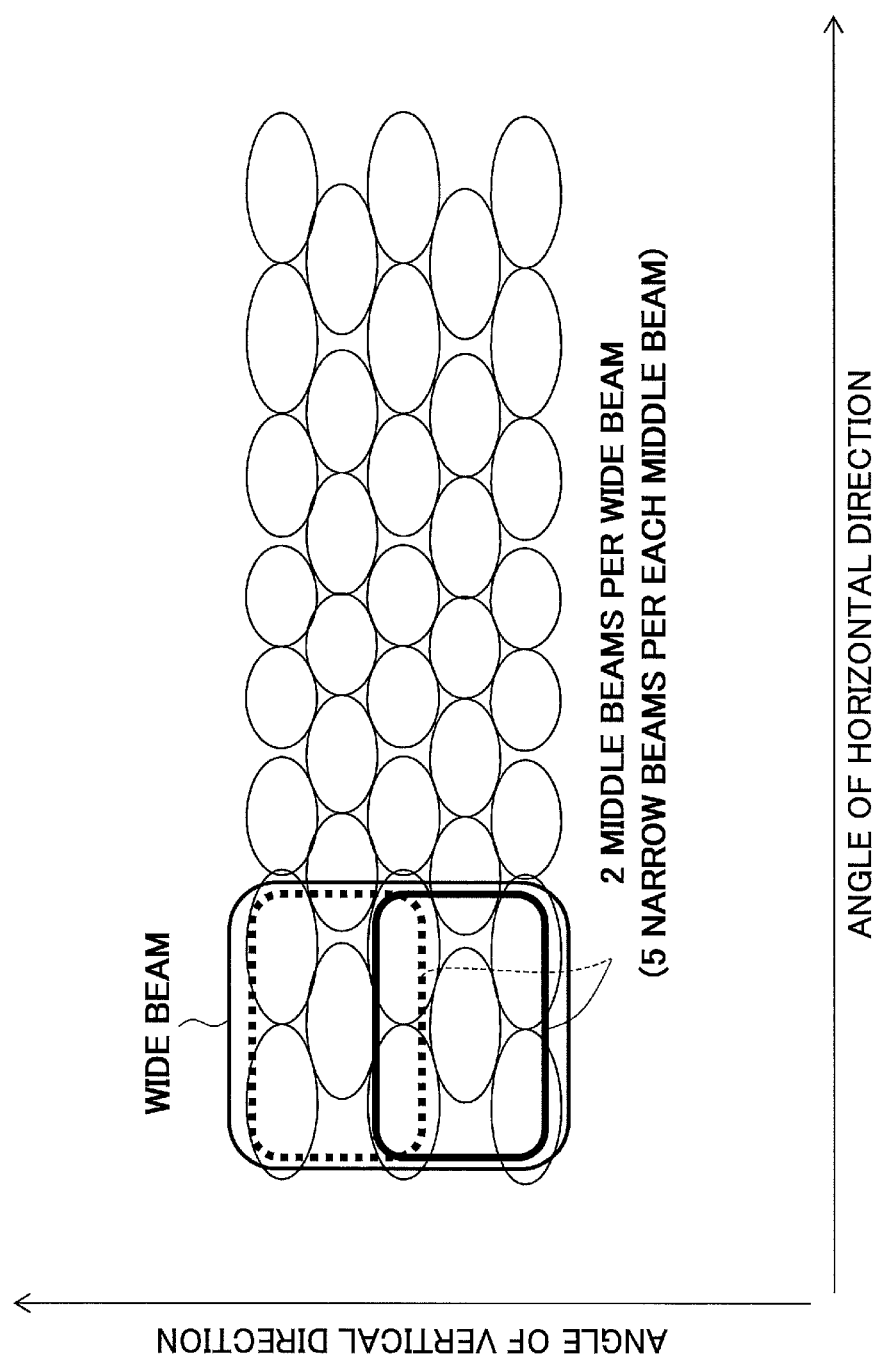
FIG. 23 is a diagram showing an example of a middle beam.

FIG. 22 shows a mapping example in a case where two middle beams (measurement reference signals) belong to one wide beam (PSS/SSS). In this case, as shown in FIG. 23, the size of the middle beam is about half of the wide beam. Also, as to resource mapping, it may be continuous subcarrier mapping as shown in FIG. 22 (a), or it may be distributed mapping as shown in FIG. 22 (b). In a case where distributed mapping is adopted, power boosting (power increase) may be adopted for the assigned subcarrier.

An example of beam ID search in the mapping example shown in FIG. 20 is described with reference to FIG. 24 and FIG. 25.

Figure 24:
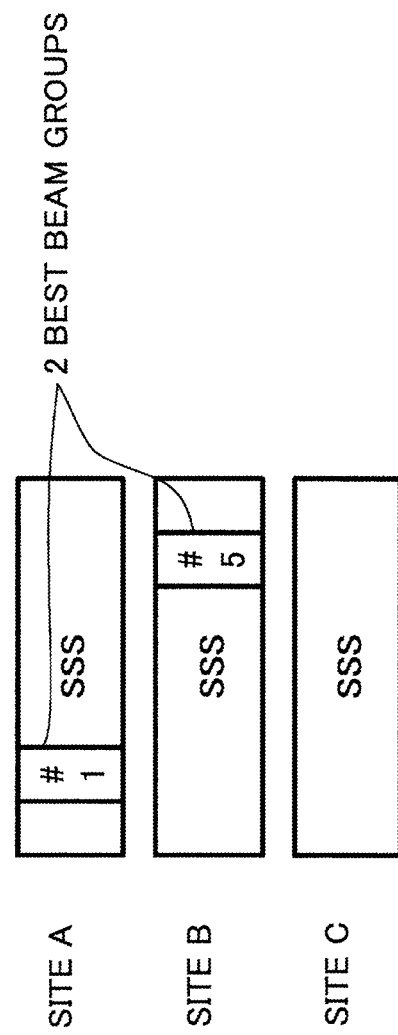
FIG. 24 is a diagram for explaining an example of hierarchical beam search.

In the example shown in FIG. 24, the user apparatus 20 receives PSS/SSS from three base stations (site A, site B, site C). It is assumed that, among the plurality of received signals, the user apparatus 20 well receives a signal transmitted by a wide beam of a beam group ID #1 of the site A and a signal transmitted by a wide beam of a beam group ID #5 of the site B, in which "well receive" means, for example, receiving the signal with received power equal to or greater than a predetermined threshold, with received power up to a predetermined n-th value from the upper value (second in the example of FIG. 24), or the like.

It is assumed that the user apparatus 20 holds resource information and sequences (beam IDs) of a plurality of measurement reference signals belonging to the beam group ID #1 of the site A and the beam group ID #5 of the site B. These pieces of information may be received from the macro base station 10 by reporting the beam group ID #1 of the site A and the beam group ID #5 of the site B to the macro base station 10 as a measurement report, or, in an earlier stage (a stage where the user apparatus 20 enters the coverage of the macro base station 10, or the like), the user apparatus 20 may receive, from the macro base station 10, correspondence information between each beam group ID of each site, and resources and sequences of measurement reference signals. Also, the information may be obtained by a method other than these.

Figure 25:
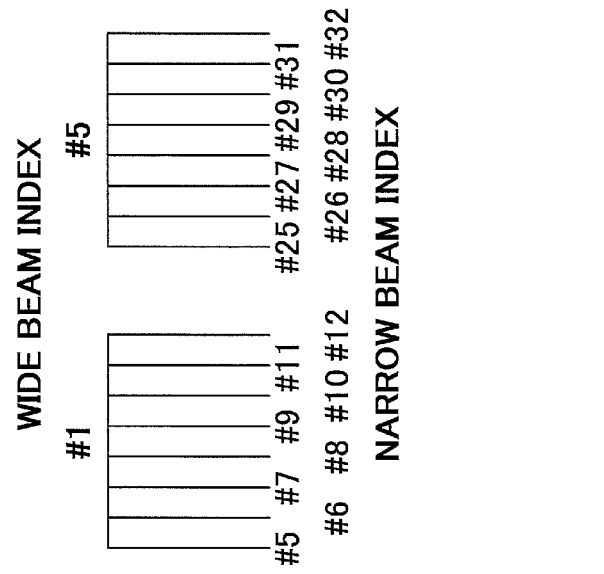
FIG. 25 is a diagram for explaining an example of hierarchical beam search.

As show in FIG. 25 (a), the user apparatus 20 performs received power measurement of each measurement reference signal in each block belonging to the beam group IDs #1 and #5 so as to specify a measurement reference signal of the largest received power. A beam ID corresponding to the specified measurement reference signal is transmitted to the base station as the before-mentioned feedback information. For example, in the hierarchical structure shown in FIG. 25 (b), if received power of a signal of a beam #5 belonging to the beam group ID #1 is the largest, the beam ID is transmitted to the base station.

In the above-mentioned example, although beam group IDs #1 and #5 are selected for site A and site B, similar operation can be performed when beam group IDs #1 and #5 are selected only for the site A, for example.

<On CSI-RS, Beam Tracking>

In the operation example described in FIG. 8 and FIG. 11 and the like, an example is explained in which, after a well-received measurement reference signal is specified and feedback information (including beam ID) is transmitted to the base station, data transmission and reception is performed. Instead of this, or in addition to this, a precoded CSI-RS may be transmitted. In a case where CSI-RS transmission is performed in addition to measurement reference signal transmission, it is possible to position the CSI-RS as a reference signal of a lower layer of the measurement reference signal in the hierarchical structure in the present embodiment. Also, the precoded CSI-RS may be placed under the discovery signal (PSS/SSS). That is, the precoded CSI-RS may be used as the measurement reference signal described so far.

The base station can transmit the CSI-RS by a beam corresponding to a beam ID obtained from the feedback information. Also, the base station may set (configure) a feedback method (cycle, use frequency resource and the like) for the CSI-RS in the user apparatus 20 based on the feedback information.

Also, for example, the base station transmits, to the user apparatus 20, CSI-RS with a plurality of narrow beams (example: each beam may have the same width as that of transmission beam of the measurement reference signal, or each beam may be a narrower beam than the transmission beam of the measurement reference signal) by a plurality of streams at the same time, so as to be able to perform after-mentioned beam tracking. The reception resource for the CSI-RS may be dynamically assigned by EPDCCH, for example, or, may be semi-statically assigned. Also, the sequence of CSI-RS may be made UE-specific by scrambling it with an ID specific to the UE.

Beam tracking can be performed by forming beams shown in FIG. 26, for example. FIG. 26 shows a direction of beams when viewing from antennas of the base station. The lateral direction on the paper is the horizontal direction, and the longitudinal direction is the vertical direction.

The base station transmits CSI-RS, to the user apparatus 20, for tracking by using beams #1~#6 other than a beam (current beam) #0 that is selected by the measurement reference signal and currently formed. The beams #1~#6 are candidate beams that are used when the current beam #0 cannot follow the user apparatus 20. Together with the beam #0 for data transmission and the candidate beams #1~#6, beam streams for beam tracking are formed.

As an example, in a case where the base station supports 8 antenna ports by dual polarized antennas, one antenna port (one polarization) may be used for transmission of each candidate beam (6 beams in total), two antenna ports (two dual polarizations) may be used for transmission of the current beam. Also, when there are a plurality of paths (example: when a signal is received from two directions like the configuration of FIG. 2), beam streams of each path may be realized by different subframes.

When the user apparatus 20 receives the beam streams, the user apparatus 20 measures received power and the like of each beam so as to transmit a feedback of a beam number (example: included in a sequence of CSI-RS) of a good reception state to the base station. The beam number that is fed back may be an optimum beam number or may be upper X beam numbers. Also, measurement results for all beams #0~#6 may be fed back, or, measurement results may be fed back in a descending order of reception quality, or in an ascending order of measurement result. The feedback can be performed periodically with a cycle based on a configuration from the base station. Also, as a feedback for CSI-RS, RI, CQI and PMI may be transmitted in addition to the beam number.

Figure 27:
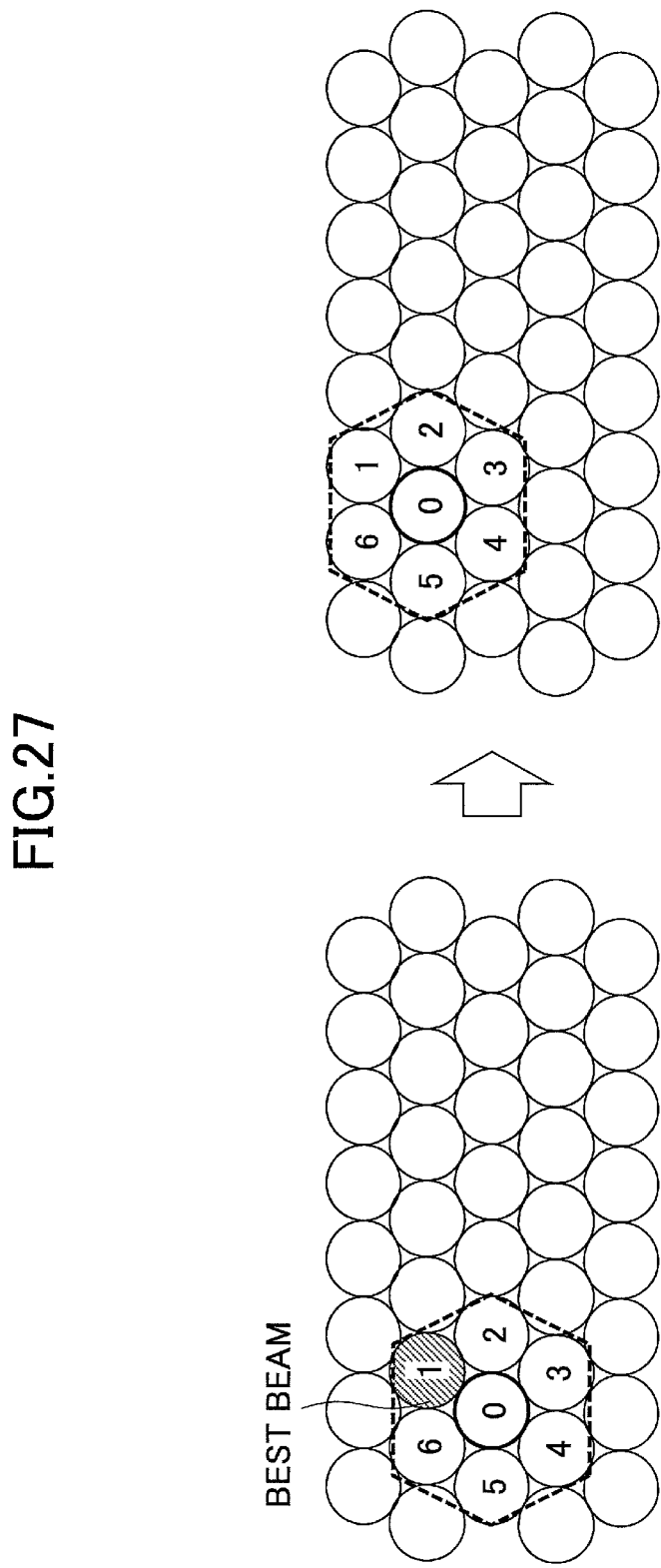
FIG. 27 is a diagram for explaining beam tracking.

The base station sets an optimum beam for the user apparatus 20 as a current beam #0 based on the feedback information of beam tracking so as to cause the user apparatus 20 to follow the direction of data transmission. The situation is shown in FIG. 27. The example of FIG. 27 shows that the best beam #1 is set as beam #0 next. In a case where moving speed of the user apparatus 20 is high and the like, when beam tracking is deviated, beam selection by the measurement reference signal is performed.

<Signal Mapping to CC in Carrier Aggregation>

The user apparatus 20 can perform communication by carrier aggregation (CA) by using a plurality of component carriers (CCs) between the user apparatus 20 and the base station.

In this concrete example, for example, in the downlink, PDSCH, EPDCCH, CSI-RS and the like are transmitted in each CC (every CC) from the base station, and as for the uplink, PUSCH, EPUCCH and SRS (sounding reference signal) are transmitted in each CC (every CC).

As to the synchronization signal (PSS/SSS and the like), the measurement reference signal, and PRACH, they may be transmitted by every CC or may be transmitted by one CC.

Figure 28:
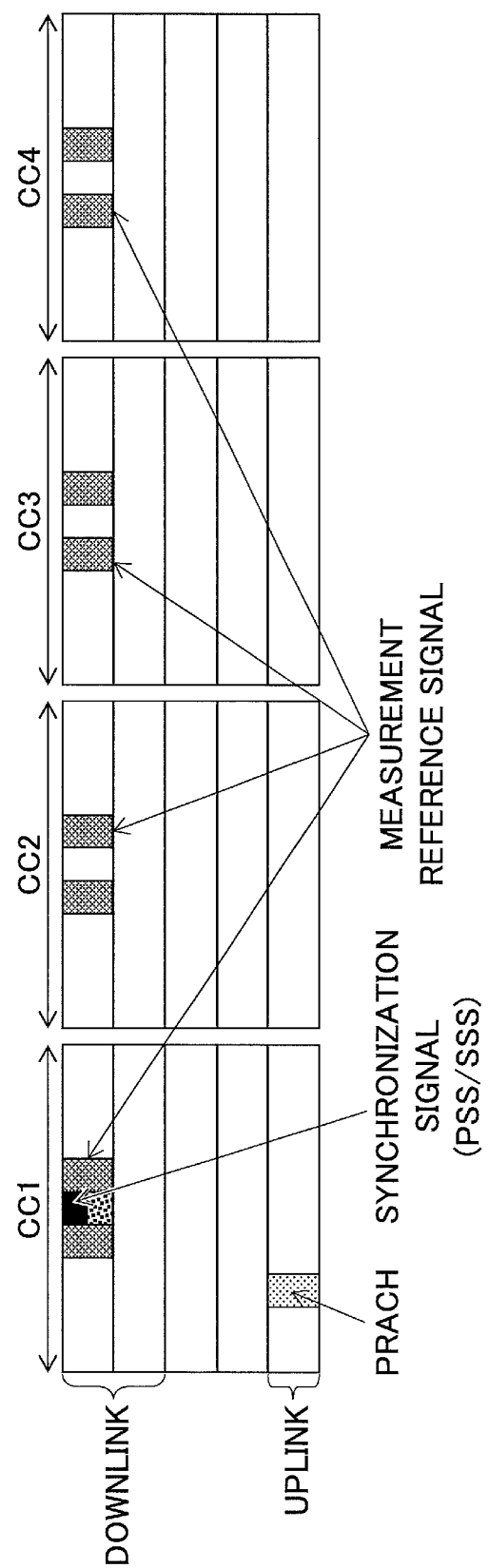
FIG. 28 is a diagram showing a mapping example of signals in carrier aggregation.

FIG. 28 shows an example of mapping of signals to CCs in carrier aggregation. By the way, although FIG. 28 shows an example of TDD in which uplink and downlink are time-divided, similar mapping is possible for FDD. In the case of FDD, in FIG. 28, frequencies of CCs are regarded to be different between uplink and downlink.

In the example of FIG. 28, PRACH is transmitted by CC1 which is one CC, and PRACH is not transmitted by CCs 2, 3 and 4 that are other CCs for forming carrier aggregation. Also, the synchronization signal (PSS/SSS) is transmitted by CC1 which is one CC, and the synchronization signal (PSS/SSS) is not transmitted by CCs 2, 3 and 4 that are other CCs for forming carrier aggregation. The measurement reference signal is transmitted by every CC.

As mentioned above, by transmitting only a signal (synchronization signal, PRACH and the like) that is initially used for performing communication of the base station by using only one CC, it becomes possible to perform processing after that quickly.

(Apparatus Configuration)

Next, configuration examples of the user apparatus 20, the macro base station 10, and the small base station 12 described so far are described. Since the small base stations 11 and 12 have the same configuration, a configuration of the small base station 12 is described as a representative. The configuration of each apparatus described below shows a configuration especially related to the present embodiment, and each apparatus includes a function of user apparatus/base station that can execute operation complying with LTE, for example.

Figure 29:
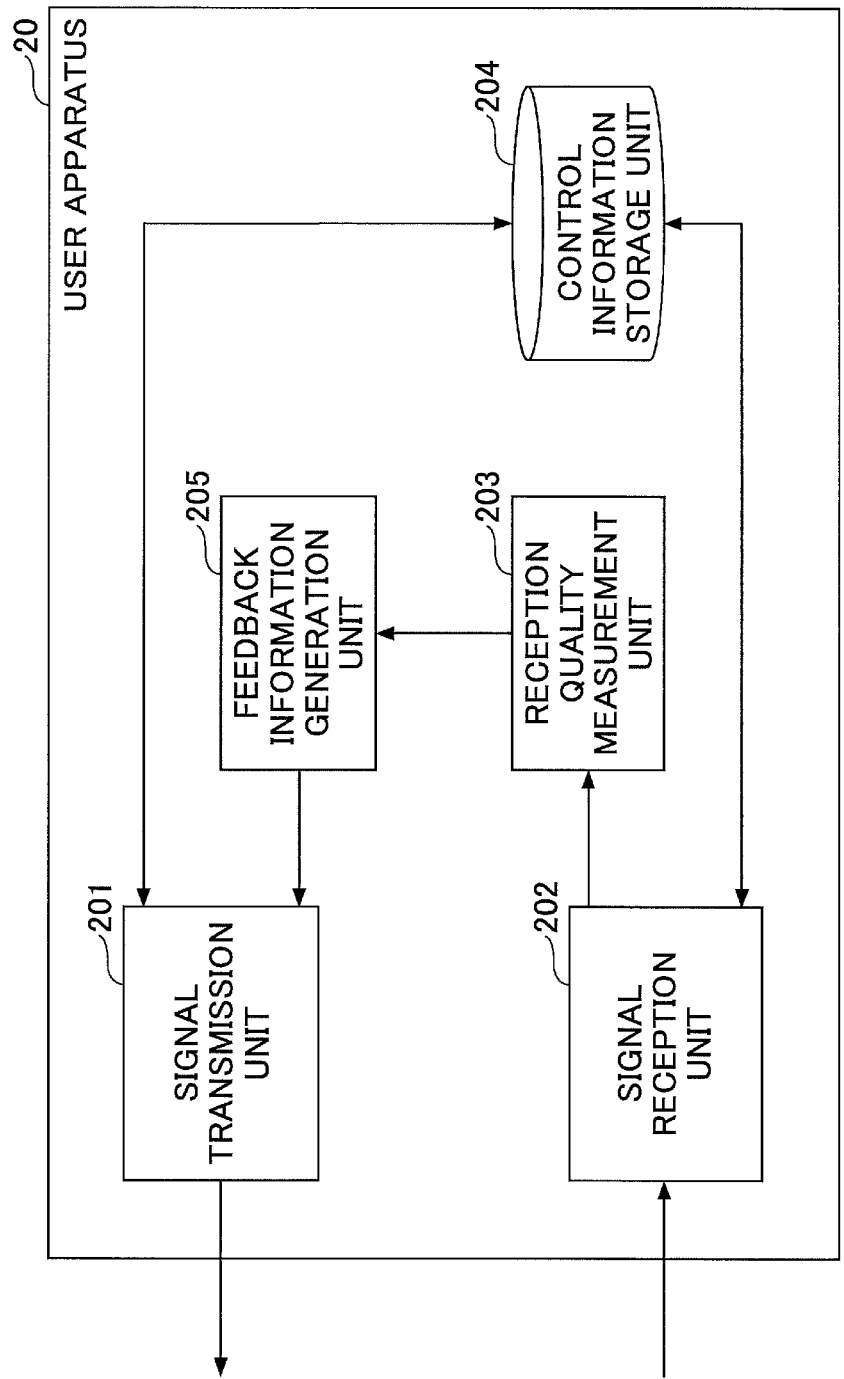
FIG. 29 is a functional block diagram of a user apparatus 20.

FIG. 29 shows a functional block diagram of the user apparatus 20. The user apparatus 20 includes a signal transmission unit 201, a signal reception unit 202, a reception quality measurement unit 203, a control information storage unit 204, and a feedback information generation unit 205.

The signal transmission unit 201 generates a signal of a lower layer from information of an upper layer, and transmits the signal by radio. The signal reception unit 202 obtains information of the upper layer from a signal of the lower layer received by radio.

The signal reception unit 202 obtains macro-assisted information from a control signal and the like received from the macro-base station 10, stores the macro-assisted information in the control information storage unit 204, and receives a discovery signal transmitted from a small base station based on the macro-assisted information stored in the control information storage unit 204. Also, the signal reception unit 202 receives control information (information of measurement reference signals that should be searched, and the like) from the macro base station 10, stores it in the control information storage unit 204, and receives a measurement reference signal based on the control information.

The control information storage unit 204 stores various types of control information (macro-assisted information and the like) received from the macro base station 10. Also, the control information storage unit 204 may store information (information that is set beforehand, information received from the small base station, and the like) other than the information received from the macro base station 10.

The reception quality measurement unit 203 measures reception quality (received power and the like) of a discovery signal received by the signal reception unit 202, passes the measurement result to the feedback information generation unit 205, measures (estimates) reception quality (received power, CQI, rank and the like) of a measurement reference signal received by the signal reception unit 202, and passes the measurement result to the feedback information generation unit 205. Also, the reception quality measurement unit 203 can measure reception quality of CSI-RS for beam tracking.

The feedback information generation unit 205 generates feedback information from the measurement result obtained from the discovery signal (forming a proper format, and the like), passes the feedback information to the signal transmission unit 201, and generates feedback information from a measurement result obtained from the measurement reference signal (forming a proper format, and the like), and passes the feedback information to the signal transmission unit 201. Also, the feedback information generation unit 205 can generate feedback information based on the CSI-RS for beam tracking.

The signal transmission unit 201 transmits feedback information based on measurement result obtained from the discovery signal to the macro base station 10 or the small base station 12 as a measurement report. Also, the signal transmission unit 201 transmits feedback information based on a measurement result obtained from the measurement reference signal to the small base station 12. Also, the signal transmission unit 201 can transmit feedback information based on a measurement result obtained from CSI-RS for beam tracking to the small base station 12. The signal reception unit 202 also includes a function for establishing synchronization (time synchronization, frequency synchronization) with the small base station 12 based on the received discovery signal (PSS/SSS and the like).

Figure 30:
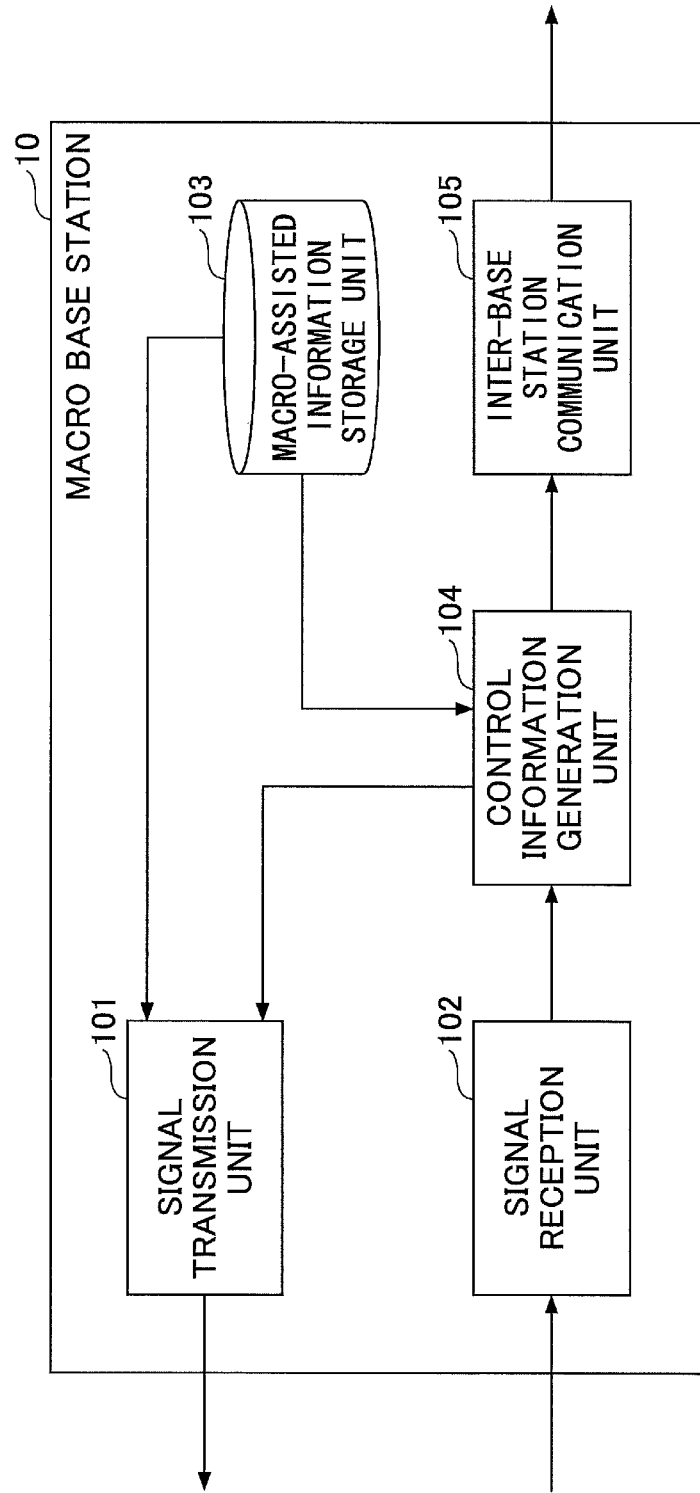
FIG. 30 is a functional block diagram of a macro base station 10.

FIG. 30 shows a functional block diagram of the macro base station 10. As shown in FIG. 30, the macro base station 10 includes a signal transmission unit 101, a signal reception unit 102, a macro-assisted information storage unit 103, a control information generation unit 104, and an inter-base station communication unit 105.

The signal transmission unit 101 generates a signal of a lower layer from information of an upper layer, and transmits the signal by radio. The signal reception unit 102 obtains information of the upper layer from a signal of the lower layer received by radio. The macro-assisted information storage unit 103 stores macro-assisted information. The macro-assisted information includes transmission timing information of a discovery signal used in the coverage area of the macro base station 10, and sequence information of the discovery signal. Also, the macro-assisted information storage unit 103 stores transmission timing of measurement reference signals and sequence information of measurement reference signals in addition to the above-mentioned information of the discovery signal. The signal transmission unit 101 transmits macro-assisted information stored in the macro-assisted information storage unit 103 to the user apparatus 20. Also, the signal transmission unit 101 transmits control information generated by the control information generation unit 104 to the user apparatus 20.

Also, the signal reception unit 102 receives a measurement report based on measurement of the discovery signal from the user apparatus 20, and the control information generation unit 104 generates control information (information of measurement reference signals and the like) based on the measurement report. The inter-base station communication unit 105 transmits control information (assignment information of SCell and the like) generated by the control information generation unit 104 to the small base station 12.

FIG. 31 shows a functional block diagram of the small base station 12. As shown in FIG. 31, the small base station 12 includes a signal transmission unit 121, a signal reception unit 122, a control information generation unit 123, and an inter-base station communication unit 124.

The signal transmission unit 121 generates a signal of a lower layer from information of an upper layer, and transmits the signal by radio. The signal reception unit 122 obtains information of the upper layer from a signal of the lower layer received by radio.

The signal reception unit 122 receives feedback information based on measurement by the measurement reference signal from the user apparatus 20, and the control information generation unit 123 generates control information (assignment information and the like of narrow beams, resources, MCS, rank and the like for data signal transmission) based on the feedback information. Also, the signal transmission unit 121 transmits control information generated by the control information generation unit 123 to the user apparatus 20. The inter-base station communication unit 124 receives control information (assignment information of SCell, and the like) from the macro base station 10, and the signal transmission unit 121 and the signal reception unit 122 performs, for example, transmission and reception control for carrier aggregation using a PCell of the macro base station 10 and an SCell of the small base station 12 based on the control information. Also, as shown in FIG. 28, the signal transmission unit 121 and the signal reception unit 122 can perform signal transmission and reception in carrier aggregation with the user apparatus 20. Further, it is also possible that the signal transmission unit 121 transmits CSI-RS for beam tracking, the signal reception unit 122 receives feedback information based on CSI-RS, the control information generation unit 123 selects an optimum beam based on the feedback information, generates control information including a selected result, and transmits the control information from the signal transmission unit 121.

In examples described so far, although the small base station 12 receives feedback information based on measurement of the measurement reference signal so as to perform assignment of a downlink narrow beam for the user apparatus 20 and the like, it is also possible to use TDD (time division duplex) in the radio communication system of the present embodiment and to perform assignment of downlink narrow beams by utilizing reciprocity of TDD. That is, in TDD, since frequencies of uplink and downlink are the same, for example, the small base station 12 determines a narrow beam of the receiving side (uplink) that becomes the best reception quality based on a signal received from the user apparatus 20 so as to assign a narrow beam of a reverse direction (downlink direction) of the determined narrow beam to the user apparatus 20 as a downlink narrow beam.

Also, the above-mentioned method of TDD and the method by feedback information described so far may be used in combination. For example, an operation can be performed in which, when a downlink narrow beam obtained by TDD is close to a narrow beam assigned based on the feedback information described so far (within a range of a predetermined threshold), the downlink narrow beam obtained by TDD is adopted, and when it is not close, the narrow beam assigned based on the feedback information is adopted.

(Summary of Embodiments, Effects and the Like)

As described above, in the present embodiment, there is provided a user apparatus configured to communicate with a base station in a radio communication system including a base station and the user apparatus, including:

first reference signal reception means configured to measure a received power of first reference signals, transmitted from the base station, that are associated with a plurality of different identifiers, and to select a specific first reference signal;

report means configured to report an identifier and a received power of the first reference signal selected by the first reference signal reception means to the base station or a macro cell base station;

second reference signal reception means configured to receive a plurality of second reference signals transmitted from the base station; and measurement means configured to measure a reception quality of the second reference signals received by the second reference signal reception means, and to transmit feedback information based on the reception quality to the base station.

According to this user apparatus, it becomes possible to perform operation of receiving a first reference signal first, then, next, receiving a restricted number of second reference signals corresponding to the first reference signal. Thus, it becomes possible to efficiently select a specific beam for use in communication from among a plurality of beams formed by the base station. In the above configuration, the first reference signal and the second reference signal are used. However, even when reference signals whose number is equal to or greater than the above number are used, since there are the first reference signal and the second reference signal, the above-mentioned user apparatus includes a user apparatus using reference signals of equal to or greater than 3 layers.

The user apparatus may include assistance information reception means configured to receive assistance information, from the macro cell base station, for restricting candidates of identifiers for measuring the plurality of first reference signals. By receiving assistance information from the macro base station in this way, the user apparatus can receive a restricted number of first reference signals.

Also, the user apparatus may establish synchronization with the base station based on the first reference signal received by the first reference signal reception means. By providing a discovery signal with a function of a synchronization signal in this way, the user apparatus can efficiently start communication with thee base station.

The plurality of second reference signals are associated with a plurality of different numbers, and the measurement means may select a specific second reference signal based on the reception quality and transmit a number and the reception quality of the selected second reference signal to the base station as feedback information. By perform selection based on the reception quality, an optimum second reference signal can be determined.

Also, for example, the report means reports the identifier and the received power of the selected first reference signal using a physical uplink shared channel, and the measurement means transmits the feedback information based on the reception quality of the second reference signal using a physical uplink control channel.

Also, the first reference signal reception means may receive the first reference signals mapped to only a part of a frequency area, and the second reference signal reception means may receive the second reference signals mapped to a frequency area wider than the frequency area to which the first reference signals are mapped. By mapping the first reference signal only to a part of a frequency region, even a low capability user apparatus can discover the first reference signal. Also, by mapping the second reference signal to a frequency area wider than the frequency area to which the first reference signal is mapped, the reception quality can be measured over a wide band.

Also, in the present embodiment, there is provided a base station configured to communicate with a user apparatus in a radio communication system including the base station and the user apparatus, including:

first reference signal transmission means configured to transmit first reference signals associated with a plurality of different identifiers;

second reference signal transmission means configured to transmit a plurality of second reference signals at a timing different from a timing when transmitting the first reference signals; and information reception means configured to receive feedback information based on a reception quality of the second reference signals measured in the user apparatus, wherein the first reference signal transmission means transmits the first reference signals mapped only to a part of a frequency area, and wherein the second reference signal transmission means transmits the second reference signals mapped to a frequency area wider than the frequency area to which the first reference signals are mapped.

In the above configuration, the first reference signal and the second reference signal are used. However, even when reference signals whose number is equal to or greater than the above number are used, since there are the first reference signal and the second reference signal, the above-mentioned base station includes a base station using reference signals of equal to or greater than 3 layers.

The plurality of second reference signals are associated with a plurality of different numbers, and the information reception means may receive a number and a reception quality of a selected second reference signal selected by the user apparatus based on the reception quality as feedback information. Accordingly, the base station can know a reception quality corresponding to the second reference signal so as to be able to perform control such as rank adaptation, link adaptation, and the like.

The user apparatus UE described in the present embodiment may include a CPU and a memory and may be realized by executing a program by the CPU (processor), or may be realized by hardware such as hardware circuits including logics of processing described in the present embodiment, or may be configured by coexistence of a program and hardware.

The base station described in the present embodiment may include a CPU and a memory and may be realized by executing a program by the CPU (processor), or may be realized by hardware such as hardware circuits including logics of processing described in the present embodiment, or may be configured by coexistence of a program and hardware.

In the above, each embodiment has been explained. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus and the base station have been explained by using functional block diagrams. However, each apparatus may be implemented in hardware, software, or a combination thereof.

The software executed by a processor provided in the user apparatus and the software executed by a processor provided in the base station according to an embodiment of the present invention may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention. The present international patent application claims priority based on Japanese patent application No. 2014-018044, filed in the JPO on Jan. 31, 2014 and Japanese patent application No. 2014-094156, filed in the JPO on Apr. 30, 2014, and the entire contents of the Japanese patent application No. 2014-018044 and the Japanese patent application No. 2014-094156 are incorporated herein by reference.

DESCRIPTION OF REFERENCE SIGNS 10 macro base station
11 small base station
12 small base station
20 user apparatus
101 signal transmission unit
102 signal reception unit
103 macro-assisted information storage unit
104 control information generation unit
105 inter-base station communication unit
121 signal transmission unit
122 signal reception unit
123 control information generation unit
124 inter-base station communication unit
201 signal transmission unit
202 signal reception unit
203 reception quality measurement unit
204 control information storage unit
205 feedback information generation unit

The invention claimed is:
1. A user apparatus, comprising:
synchronization signal reception means configured to measure received power of synchronization signals that are associated with a plurality of different identifiers, and to select a specific synchronization signal;
means configured to transmit a signal including identification information corresponding to the specific synchronization signal;
reference signal reception means configured to receive a plurality of reference signals; and measurement means configured to measure a reception quality of a reference signal and to transmit feedback information based on the reception quality to a base station, wherein the synchronization signal reception means receives the synchronization signals mapped to only a part of a frequency area, and wherein the reference signal reception means receives the reference signals mapped to a frequency area wider than the frequency area to which the synchronization signals are mapped.

2. The user apparatus as claimed in claim 1, wherein the synchronization signal reception means receives the synchronization signal using assistance information.

3. The user apparatus as claimed in claim 1, wherein, the plurality of reference signals are associated with a plurality of different numbers, and wherein, the measurement means selects a specific reference signal based on the reception quality and transmits a number and the reception quality of the selected reference signal to the base station as feedback information.

4. A base station, comprising:

synchronization signal transmission means configured to transmit synchronization signals associated with of different identifiers;

reference signal transmission means configured to transmit a plurality of reference signals; and information reception means configured to receive feedback information based on a reception quality of a reference signal measured in a user apparatus, wherein the synchronization signal transmission means transmits the synchronization signals mapped only to a part of a frequency area, and wherein the reference signal transmission means transmits the reference signals mapped to a frequency area wider than the frequency area to which the synchronization signals are mapped.

5. The base station as claimed in claim 4, wherein the plurality of reference signals are associated with a plurality of different numbers, and wherein the information reception means receives a number and a reception quality of a reference signal selected by the user apparatus based on the reception quality as feedback information.

6. A communications method executed by a user apparatus, comprising:

a synchronization signal reception step of measuring received power of synchronization signals that are associated with a plurality of different identifiers, and selecting a specific synchronization signal;

a step of transmitting a signal including identification information corresponding to the specific synchronization signal;

a reference signal reception step of receiving a plurality of reference signals; and a measurement step of measuring a reception quality of a reference signal, and transmitting feedback information based on the reception quality to a base station, wherein the synchronization signal reception step receives the synchronization signals mapped to only a part of a frequency area, and wherein the reference signal reception step receives the reference signals mapped to a frequency area wider than the frequency area to which the synchronization signals are mapped.

7. A communication method executed by a base station, comprising:

a synchronization signal transmission step of transmitting synchronization signals associated with different identifiers;

a reference signal transmission step of transmitting a plurality of reference signals; and an information reception step of receiving feedback information based on a reception quality of a reference signal measured in a user apparatus, wherein the synchronization signal transmission step includes transmitting synchronization signals mapped only to a part of a frequency area, and wherein the reference signal transmission step includes transmitting the reference signals mapped to a frequency area wider than the frequency area to which the synchronization signals are mapped.

8. The user apparatus as claimed in claim 2, wherein, the plurality of reference signals are associated with a plurality of different numbers, and wherein, the measurement means selects a specific reference signal based on the reception quality and transmits a number and the reception quality of the selected reference signal to the base station as feedback information.

9. The user apparatus as claimed in claim 2, wherein the assistance information indicates a synchronization signal used for measurement of received power.

10. The user apparatus as claimed in claim 2, wherein the assistance information indicates that a number associated with the reference signal is associated with an identifier associated with the synchronization signal.

11. The user apparatus as claimed in claim 1, wherein the synchronization signal reception means measures received power of synchronization signals that are associated with a plurality of different identifiers in one slot.

* * * * *